US012210298B2

(12) United States Patent
Akagi

(10) Patent No.: US 12,210,298 B2
(45) Date of Patent: Jan. 28, 2025

(54) IMAGE FORMING APPARATUS

(71) Applicant: CANON KABUSHIKI KAISHA, Tokyo (JP)

(72) Inventor: Daisuke Akagi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/319,381

(22) Filed: May 17, 2023

(65) Prior Publication Data

US 2023/0384707 A1 Nov. 30, 2023

(30) Foreign Application Priority Data

May 27, 2022 (JP) ................................ 2022-086486
Jul. 22, 2022 (JP) ................................ 2022-117428
Aug. 23, 2022 (JP) ................................ 2022-132719
Mar. 31, 2023 (JP) ................................ 2023-059527

(51) Int. Cl.
*G03G 15/043* (2006.01)
*G03G 15/04* (2006.01)
*G03G 21/14* (2006.01)

(52) U.S. Cl.
CPC ..... *G03G 15/043* (2013.01); *G03G 15/04063* (2013.01); *G03G 21/14* (2013.01); *G03G 2215/0412* (2013.01)

(58) Field of Classification Search
CPC ........... G03G 15/043; G03G 15/04054; G03G 15/326; G03G 2215/0409; G03G 2215/0412; G03G 15/04063; G03G 2215/0407
See application file for complete search history.

(56) References Cited

U.S. PATENT DOCUMENTS 7,750,594 B2 7/2010 Clothier
9,864,318 B2 * 1/2018 Minobe .................. G03G 15/80
10,942,480 B2 * 3/2021 Motoyama ......... G03G 15/5004
2006/0158396 A1 7/2006 Jo
(Continued)

FOREIGN PATENT DOCUMENTS

JP H0674340 U 10/1994
JP 2009012324 A 1/2009
(Continued)

*Primary Examiner* — Jessica L Eley
(74) *Attorney, Agent, or Firm* — CANON U.S.A., INC. IP Division

(57) ABSTRACT

An image forming apparatus includes a photosensitive member, light-emitting chips, and a controller integrated circuit (IC). Provided in each of the light-emitting chips are a plurality of light-emitting units that emit light for exposing the photosensitive member, a circuit unit that turns on and off the plurality of light-emitting units based on image data, and a storage unit that stores control data indicating a target amount of light of the plurality of light-emitting units. The light-emitting chips are arranged along a rotational axis direction of the photosensitive member. Each of the light-emitting chips is connected to the controller IC by a different one of a plurality of signal lines. In a case where the output control data is transmitted from the controller IC to each of the light-emitting chips via the different one of the plurality of signal lines, the transmitted control data is stored in the storage unit.

16 Claims, 30 Drawing Sheets

(56) References Cited

U.S. PATENT DOCUMENTS

| | | | | |
|---|---|---|---|---|
| 2007/0132621 | A1 | 6/2007 | Choi | |
| 2008/0063431 | A1 | 3/2008 | Ogihara | |
| 2012/0256998 | A1 | 10/2012 | Inoue | |
| 2015/0212448 | A1 | 7/2015 | Kim | |
| 2016/0116858 | A1* | 4/2016 | Sato | G03G 15/0178 347/116 |
| 2019/0004461 | A1* | 1/2019 | Kakutani | G03G 15/0258 |
| 2020/0150554 | A1* | 5/2020 | Furuta | G03G 15/04054 |
| 2020/0166863 | A1* | 5/2020 | Noro | G03G 15/043 |
| 2020/0366284 | A1 | 11/2020 | Ito | |
| 2021/0055669 | A1 | 2/2021 | Yoshida | |
| 2022/0146959 | A1 | 5/2022 | Furuta | |
| 2022/0197176 | A1 | 6/2022 | Nakanishi | |
| 2023/0324826 | A1 | 10/2023 | Daisuke | |
| 2023/0384706 | A1 | 11/2023 | Akagi | |
| 2023/0384707 | A1 | 11/2023 | Akagi | |
| 2024/0027932 | A1 | 1/2024 | Akagi | |
| 2024/0069461 | A1 | 2/2024 | Akagi | |

FOREIGN PATENT DOCUMENTS

| | | | |
|---|---|---|---|
| JP | 2012125967 | A | 7/2012 |
| JP | 2022024650 | A | 2/2022 |
| WO | 2021039515 | A | 3/2021 |

* cited by examiner

IMAGE FORMING APPARATUS

BACKGROUND

Field

The present disclosure relates to an image forming apparatus that forms an image using an exposure unit including a plurality of light-emitting units.

Description of the Related Art

An electrophotographic image forming apparatus exposes a photosensitive member that is rotationally driven, thereby forming an electrostatic latent image on the photosensitive member. Then, the image forming apparatus develops the electrostatic latent image using toner, thereby forming an image. A direction parallel to the rotational axis of the photosensitive member is referenced as a main scanning direction. United States Patent Application Publication No. 2022/0146959 discusses an image forming apparatus using an exposure unit in which a plurality of light-emitting units is arranged in a main scanning direction. In the image forming apparatus discussed in United States Patent Application Publication No. 2022/0146959, a plurality of light-emitting chips in each of which electrodes, an organic electroluminescent (EL) film, and a circuit unit for causing the organic EL film to emit light are formed on a silicon wafer is mounted on a substrate. To the circuit unit of each light-emitting chip, for example, control data regarding the magnitude of a voltage that is to be applied to the electrodes (a current that is to be supplied to the organic EL film) is transmitted from a control unit of the image forming apparatus. The control data is stored in a register provided in the circuit unit. The circuit unit applies a voltage to the electrodes based on image data transmitted from the control unit of the image forming apparatus and control data regarding the magnitude of the voltage stored in the register. As a result, the organic EL film emits light.

In some conventional image forming apparatuses, a control unit of the image forming apparatus transmits control data to each light-emitting chip, and therefore, the control unit of the image forming apparatus and each light-emitting chip are connected to each other in a bus-like manner by a signal line.

Thus, in a case where control data is transmitted to each light-emitting chip, the control unit of the conventional image forming apparatus repeatedly specifies a single light-emitting chip among a plurality of light-emitting chips and transmits control data to a specified light-emitting chip. In such a configuration, the time required to transmit pieces of control data to all the light-emitting chips mounted on a substrate increases. Thus, there is a demand for a configuration for shortening the time of transmission of pieces of control data.

SUMMARY

The present disclosure is directed to providing a technique for shortening the time of transmission of pieces of control data to light-emitting chips of an exposure device.

According to an aspect of the present disclosure, an image forming apparatus includes a photosensitive member configured to rotate, a plurality of light-emitting chips in each of which are provided a plurality of light-emitting units configured to emit light for exposing the photosensitive member, a circuit unit configured to turn on and off the plurality of light-emitting units based on image data for controlling the turning on and off of the plurality of light-emitting units, and a storage unit configured to store control data indicating a target amount of light of the plurality of light-emitting units, wherein the plurality of light-emitting chips is arranged along a rotational axis direction of the photosensitive member, and a controller integrated circuit (IC) configured to output control data, wherein each of the plurality of light-emitting chips is connected to the controller IC by a different one of a plurality of signal lines, and wherein, in a case where the output control data is transmitted from the controller IC to each of the plurality of light-emitting chips via the different one of the plurality of signal lines, the transmitted control data is stored in the storage unit.

Further features of the present disclosure will become apparent from the following description of exemplary embodiments with reference to the attached drawings.

DESCRIPTION OF THE EMBODIMENTS

With reference to the attached drawings, exemplary embodiments will be described in detail below. The following exemplary embodiments do not limit the disclosure according to the appended claims. Although a plurality of features is described in the exemplary embodiments, not all the plurality of features is essential for the disclosure, and the plurality of features may be optionally combined together. Further, in the attached drawings, the same or similar components are designated by the same reference numbers, and are not redundantly described.

Figure 1:
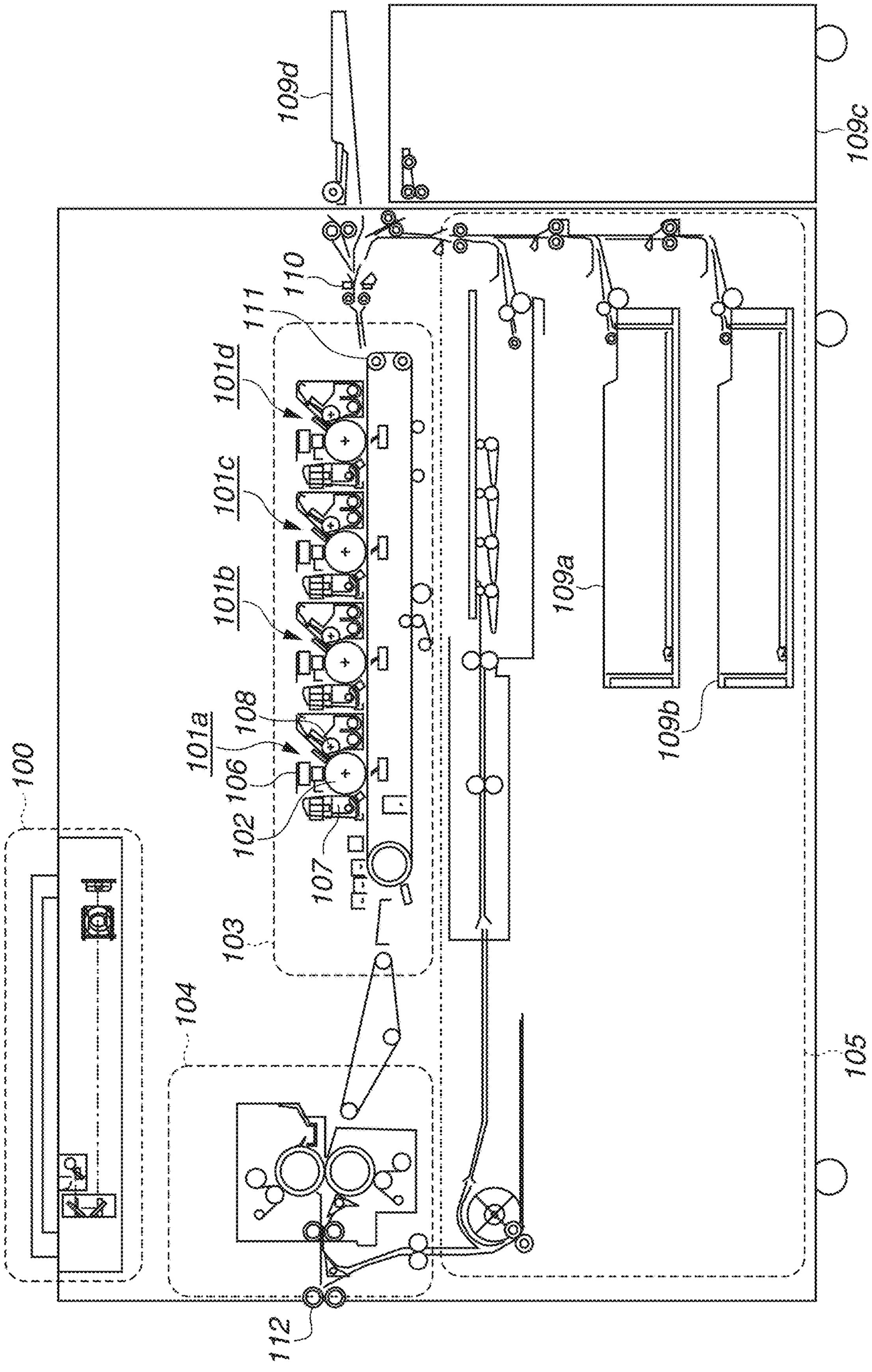
FIG. 1 is a schematic diagram illustrating a configuration of an image forming apparatus.

FIG. 1 is a schematic diagram illustrating the configuration of an image forming apparatus according to a first exemplary embodiment. A reading unit 100 optically reads a document placed on a document platen and generates image data representing the reading result. An image formation device 103 forms an image on a sheet, for example, based on image data generated by the reading unit 100 or based on image data received from an external apparatus via a network.

The image formation device 103 includes image forming units 101*a*, 101*b*, 101*c*, and 101*d*. The image forming units 101*a*, 101*b*, 101*c*, and 101*d* form black, yellow, magenta, and cyan toner images, respectively. The image forming units 101*a*, 101*b*, 101*c*, and 101*d* have similar configurations, and therefore will hereinafter be also collectively referred to as "the image forming units 101".

A photosensitive member 102 of each image forming unit 101 is rotationally driven in the clockwise direction in FIG. 1 when an image is formed.

A charging device 107 charges the photosensitive member 102. An exposure head 106 serving as an exposure device exposes the photosensitive member 102 according to image data, thereby forming an electrostatic latent image on the photosensitive member 102. A developing device 108 develops the electrostatic latent image on the photosensitive member 102 using toner. The toner image on the photosensitive member 102 is transferred to a sheet conveyed on a transfer belt 111. The toner images on the respective photosensitive members 102 are transferred to the sheet in a superimposed manner, whereby it is possible to reproduce a color different from black, yellow, magenta, and cyan.

A conveying unit 105 controls the feeding and the conveyance of a sheet. Specifically, the conveying unit 105 feeds a sheet from a unit specified among internal storage units 109*a* and 109*b*, an external storage unit 109*c*, and a manual feed unit 109*d* to a conveying path in the image forming apparatus.

The fed sheet is conveyed to registration rollers 110. The registration rollers 110 convey the sheet onto the transfer belt 111 at a predetermined timing so that toner images on the photosensitive members 102 are transferred to the sheet. As described above, while the sheet is conveyed on the transfer belt 111, the toner images are transferred to the sheet. A fixing unit 104 heats and pressurizes the sheet to which the toner images are transferred, thereby fixing the toner images to the sheet. After the toner images are fixed, the sheet is discharged outside the image forming apparatus by discharge rollers 112.

Figure 2A:
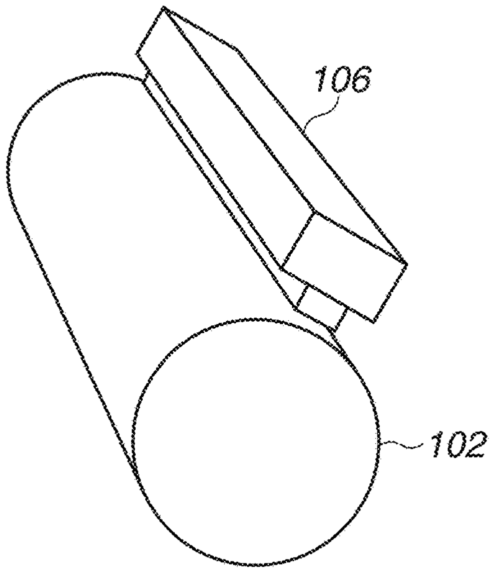
FIGS. 2A and 2B are diagrams illustrating an exposure head and a photosensitive member.
Figure 2B:
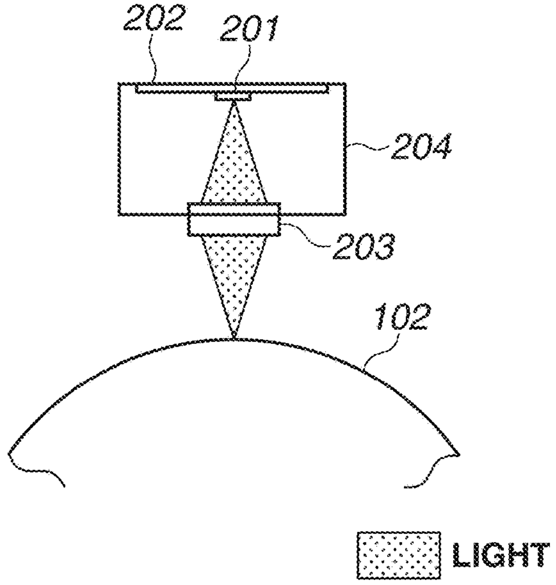

FIGS. 2A and 2B illustrate the photosensitive member 102 and the exposure head 106. The exposure head 106 includes a light-emitting point group 201, a printed circuit board 202 on which the light-emitting point group 201 is mounted, a rod lens array 203, and a housing 204 holding the rod lens array 203 and the printed circuit board 202. The rod lens array 203 collects light emitted from the light-emitting point group 201 on the photosensitive member 102, thereby forming an image formation spot of a predetermined size on the photosensitive member 102.

Figure 3A:
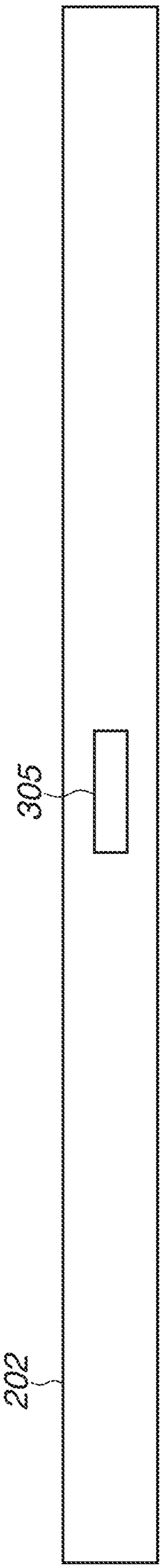
FIGS. 3A and 3B are diagrams illustrating a printed circuit board of the exposure head.
Figure 3B:
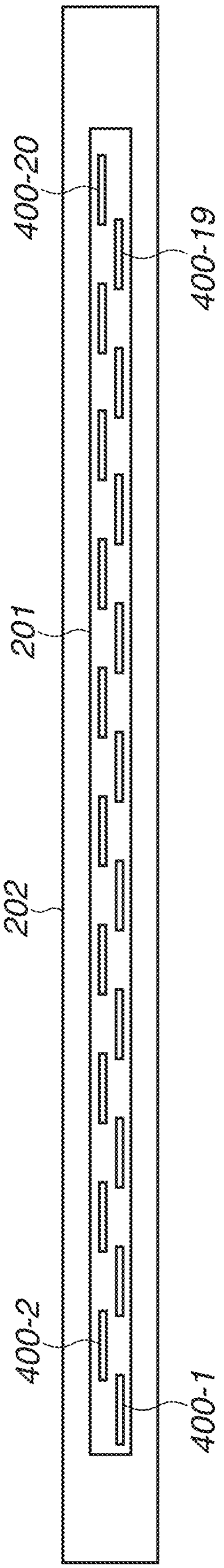

FIGS. 3A and 3B illustrate the printed circuit board 202. FIG. 3A illustrates a surface of the printed circuit board 202 on which a connector 305 is mounted, and FIG. 3B illustrates a surface of the printed circuit board 202 on which the light-emitting point group 201 is mounted (a surface on the opposite side of the surface on which the connector 305 is mounted). In the present exemplary embodiment, the light-emitting point group 201 includes 20 light-emitting chips 400-1 to 400-20. The light-emitting chips 400-1 to 400-20 are arranged in two staggered rows along a main scanning direction. In the following description, the light-emitting chips 400-1 to 400-20 will also be collectively referred to as "the light-emitting chips 400". Each light-emitting chip 400 includes a plurality of light-emitting points (light-emitting elements). The light-emitting chips 400 on the printed circuit board 202 are connected to an image controller (hereinafter also referred to as an image controller unit) 700 (FIG. 7) serving as a control unit via the connector 305.

Figure 4:
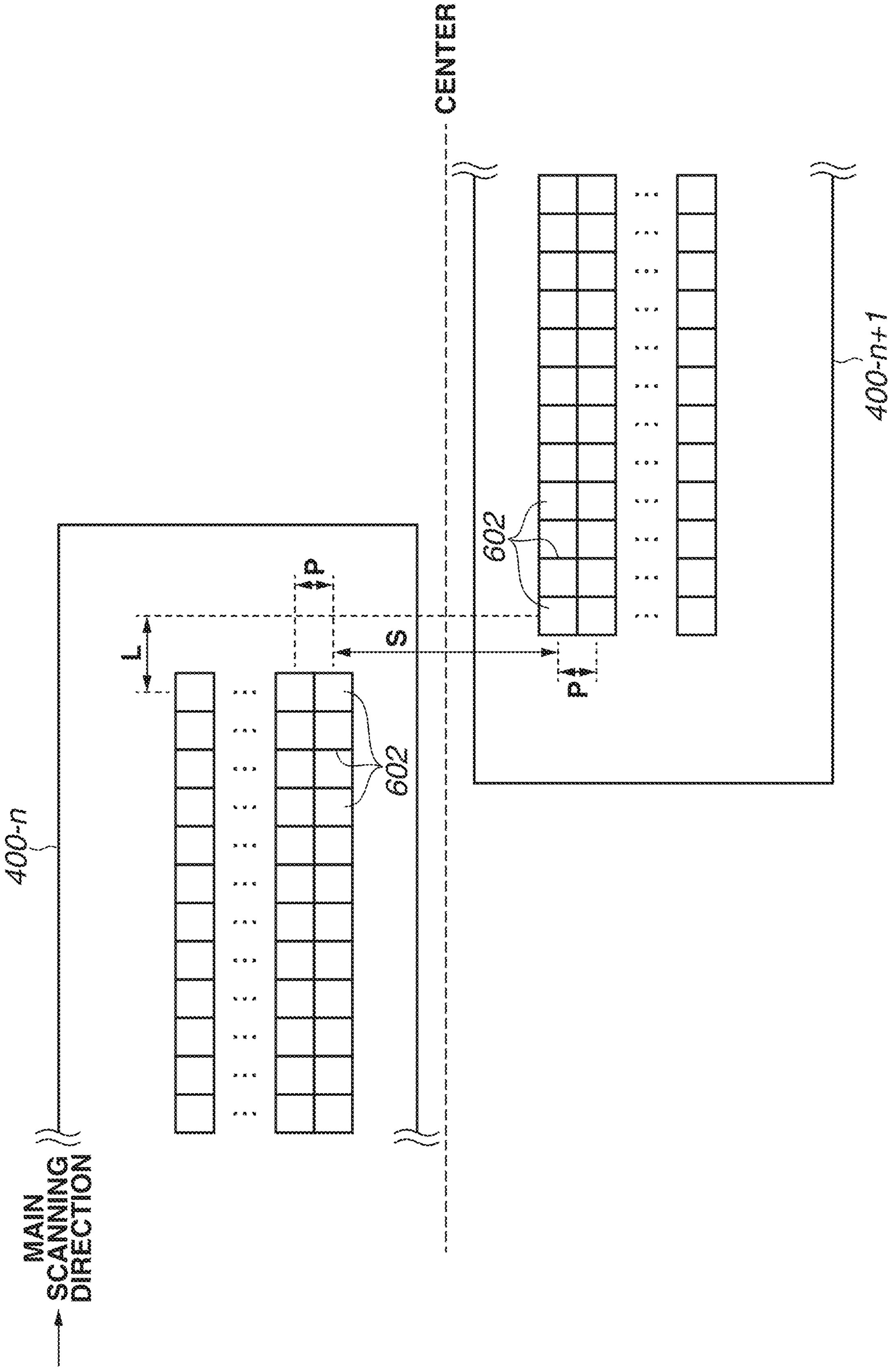
FIG. 4 is a diagram illustrating placement of light-emitting elements in a light-emitting chip.

FIG. 4 is a diagram illustrating each light-emitting chip 400 and the placement of light-emitting points 602 provided in the light-emitting chip 400. A single light-emitting chip 400 includes a plurality of sets of 748 light-emitting points 602 arranged along the main scanning direction. The plurality of sets is arranged along a sub-scanning direction orthogonal to the main scanning direction. As described above, in the light-emitting chip 400, a plurality of light-emitting points 602 is two-dimensionally placed along both the main scanning direction and the sub-scanning direction. In the following description, as an example, the number of sets is four. That is, in the following exemplary embodiments, the light-emitting chip 400 includes four sets of 748 light-emitting points 602 arranged along the main scanning direction, i.e., a total of 2992 light-emitting points 602. The pitch between light-emitting points 602 adjacent to each other in the main scanning direction is about 21.16 μm, which corresponds to a resolution of 1200 dpi. Thus, the length of a single set of 748 light-emitting points 602 in the main scanning direction is about 15.8 mm. The pitch between light-emitting points 602 adjacent to each other in the sub-scanning direction (a length P in FIG. 4) is also about 21.16 μm, which corresponds to a resolution of 1200 dpi. Further, the pitch between light-emitting points 602 in two light-emitting chips 400 adjacent to each other in the main scanning direction (a length L in FIG. 4) is also about 21.16 μm, which corresponds to a resolution of 1200 dpi.

Figure 5:
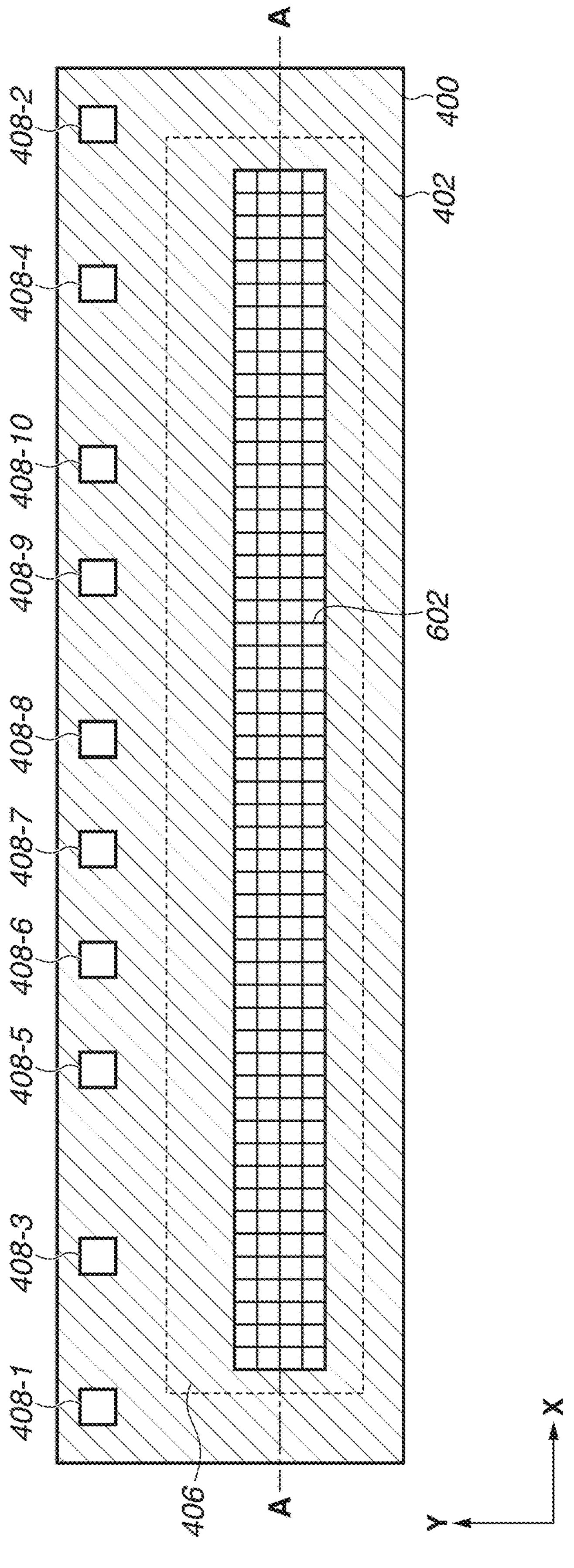
FIG. 5 is a plan view of the light-emitting chip.

FIG. 5 is a plan view of each light-emitting chip 400. The plurality of light-emitting points 602 of the light-emitting chip 400 is formed on a light-emitting substrate 402 such as a silicon substrate. In the light-emitting substrate 402, a circuit unit 406 for controlling the plurality of light-emitting points 602 is provided. To pads 408-1 to 408-10, a signal line for communicating with the image controller 700, a power supply line for connecting to a power supply, and a ground line for connecting to the ground are connected. The signal line, the power supply line, and the ground line are wires made of gold, for example.

Figure 6:
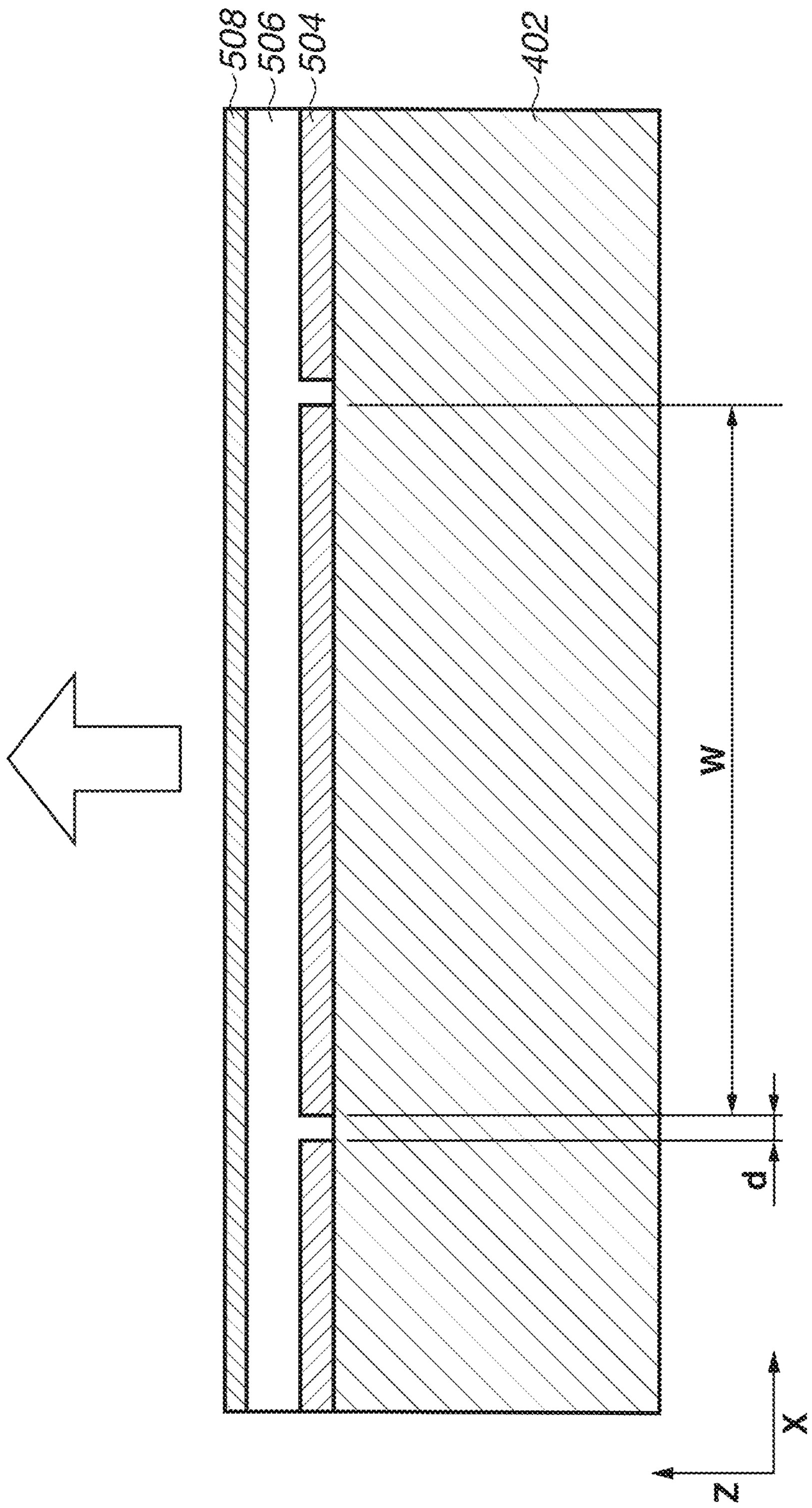
FIG. 6 is a cross-sectional view of the light-emitting chip.

FIG. 6 illustrates a part of a cross section along an A-A line in FIG. 5. On the light-emitting substrate 402, a plurality of lower electrodes 504 is formed. Between two lower electrodes 504 adjacent to each other, a gap having a length d is provided. On the lower electrodes 504, a light-emitting layer 506 is provided. On the light-emitting layer 506, an upper electrode 508 is provided. The upper electrode 508 is a single common electrode for the plurality of lower electrodes 504. If a predetermined voltage is applied between the lower electrodes 504 and the upper electrode 508, a current flows from the lower electrodes 504 to the upper electrode 508, whereby the light-emitting layer 506 emits light. Thus, an area of the light-emitting layer 506 corresponding to an area of a single lower electrode 504 corresponds to a single light-emitting point 602. That is, in the present exemplary embodiment, the light-emitting substrate 402 includes a plurality of light-emitting points 602. A light-emitting point may also be referred to as "a light-emitting unit".

As the light-emitting layer 506, for example, an organic electroluminescent (EL) film can be used. Alternatively, as the light-emitting layer 506, an inorganic EL film can be used. The upper electrode 508 can be, for example, a transparent electrode of indium tin oxide (ITO) to transmit the light emission wavelength of the light-emitting layer 506.

Although the entirety of the upper electrode 508 is configured to transmit the light emission wavelength of the light-emitting layer 506 in the present exemplary embodiment, the entirety of the upper electrode 508 does not need to transmit the light emission wavelength. Specifically, an area of the upper electrode 508 from which light from the light-emitting points 602 is emitted only needs to transmit the light emission wavelength.

Although the light-emitting layer 506 is common to all the lower electrodes 504 provided in the light-emitting chip 400 in the present exemplary embodiment, the present disclosure is not limited to this. Alternatively, for example, a configuration may be employed in which a first plurality of lower electrodes 504 among the plurality of lower electrodes 504 provided in the light-emitting chip 400 is covered by a first light-emitting layer 506, and a second plurality of lower electrodes 504 among the plurality of lower electrodes 504 provided in the light-emitting chip 400 is covered by a second light-emitting layer 506. Also in such a configuration, an area of a light-emitting layer 506 corresponding to an area of a single lower electrode 504 corresponds to a single light-emitting point 602. Yet alternatively, a light-emitting layer 506 may be individually provided for each of the plurality of lower electrodes 504 provided in the light-emitting chip 400. Also in such a configuration, an area of a light-emitting layer 506 corresponding to an area of a single lower electrode 504 corresponds to a single light-emitting point 602.

Figure 7:
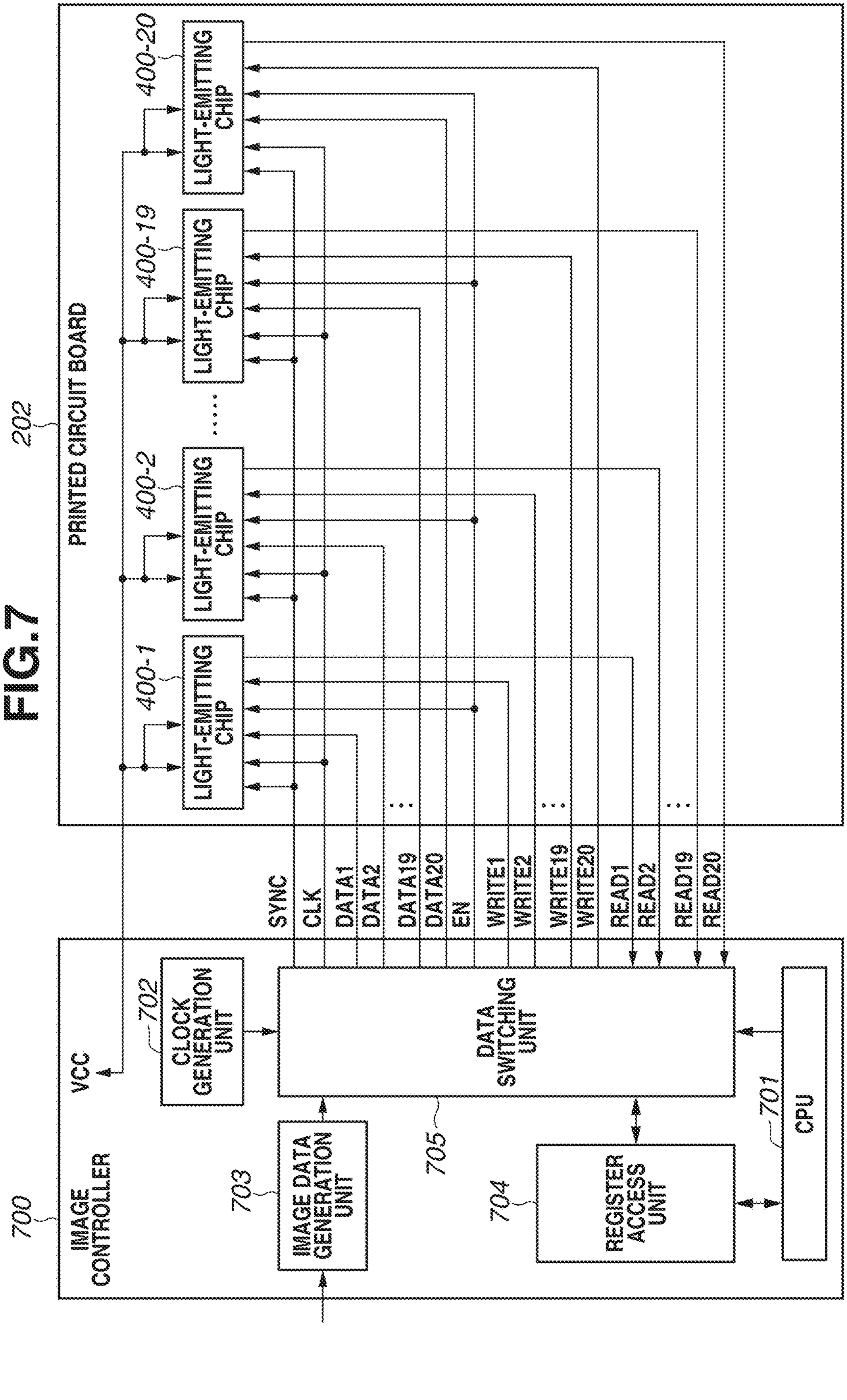
FIG. 7 is a diagram illustrating a control configuration of the light-emitting chip.

FIG. 7 illustrates the control configuration of each light-emitting chip 400. A data switching unit 705 and each light-emitting chip 400 are connected to each other by a plurality of signal lines (wires). Specifically, the data switching unit 705 and a light-emitting chip 400-*n* (n is an integer from 1 to 20) are connected to each other by a signal line DATAn, a signal line WRITEn, and a signal line READn. The signal line DATAn is used by the data switching unit 705 to transmit image data to the light-emitting chip 400-*n*. The signal line WRITEn is used by the data switching unit 705 to write control data to a register in the light-emitting chip 400-*n* or notify the light-emitting chip 400-*n* of the reading of control data. The signal line READn is used by the data switching unit 705 to read control data stored in the register in the light-emitting chip 400-*n*.

The data switching unit 705 and all the light-emitting chips 400 are connected to each other by a single signal line CLK, a single signal line SYNC, and a single signal line EN. The signal line CLK is used to transmit a clock signal for use in transmitting and receiving data through the signal lines DATAn, WRITEn, and READn. The data switching unit 705 outputs a clock signal generated based on a reference clock signal from a clock generation unit 702 to the signal line CLK. Signals transmitted to the signal lines SYNC and EN will be described below.

A central processing unit (CPU) 701 controls the entirety of the image forming apparatus. An image data generation unit 703 performs various types of image processing such as a halftone process on image data received from the reading unit 100 or an external apparatus, thereby generating image data for controlling the turning on and off of the light emission of the light-emitting points 602 in each light-emitting chip 400. The image data generation unit 703 transmits the generated image data to the data switching unit 705. When a register access unit 704 writes control data to the register in each light-emitting chip 400, the register access unit 704 receives the control data from the CPU 701 and transmits the control data to the data switching unit 705. The register access unit 704 also outputs control data read from the register in each light-emitting chip 400 to the CPU 701.

Figure 8:
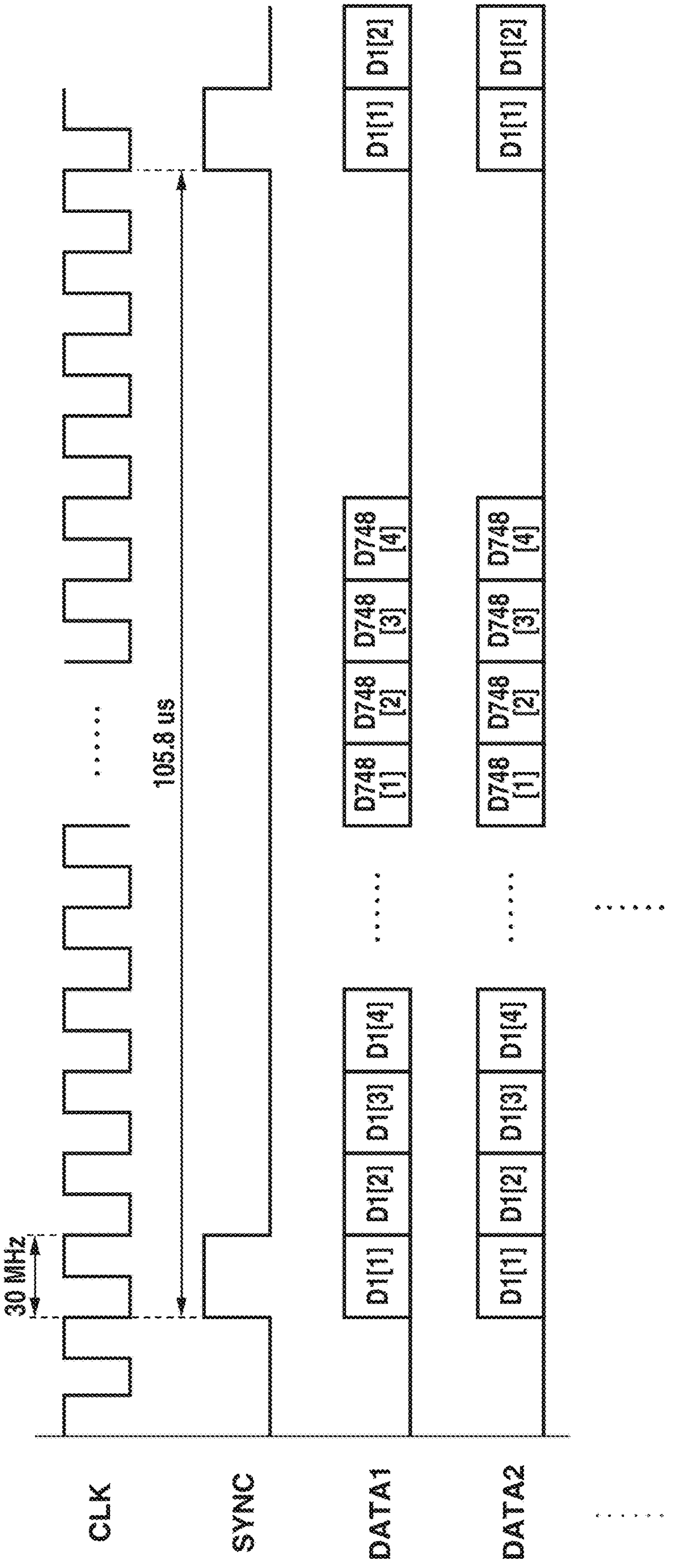
FIG. 8 is a diagram illustrating examples of signals of signal lines when image data is transmitted to the light-emitting chip.

FIG. 8 illustrates signals of signal lines in a case where image data is transmitted to each light-emitting chip 400. To the signal line SYNC, a cyclic line synchronization signal indicating the exposure timing of each line in the photosensitive member 102 is output. If the circumferential speed of the photosensitive member 102 is 200 mm/s, and the resolution in the sub-scanning direction is 1200 dpi (about 21.16 μm), the line synchronization signal is output in a cycle of about 105.8 μs. The data switching unit 705 transmits pieces of image data to signal lines DATA1 to DATA20 in synchronization with the rising edge of the line synchronization signal. In the present exemplary embodiment, since each light-emitting chip 400 includes 2992 light-emitting points 602, the data switching unit 705 needs to transmit image data indicating whether or not each of a total of 2992 light-emitting points 602 emits light, to each light-emitting chip 400 within a cycle of about 105.8 μs. To transmit image data for a total of 2992 light-emitting points 602 within a period of about 105.8 μs, in this example, as illustrated in FIG. 8, the data switching unit 705 sets the frequency of a clock signal to be transmitted to the signal line CLK to 30 MHz when transmitting the image data.

Figure 9:
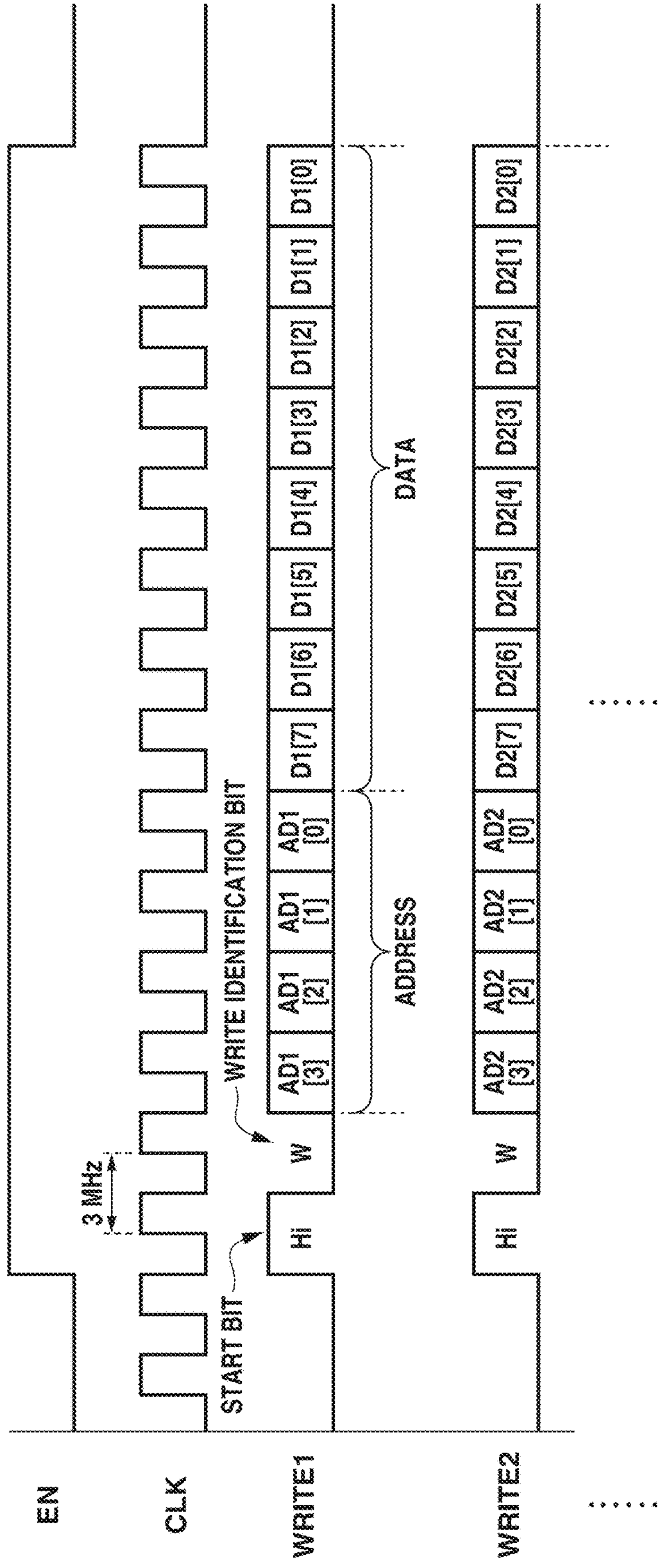
FIG. 9 is a diagram illustrating examples of signals of signal lines when control data is written to a register in the light-emitting chip.

FIG. 9 illustrates signals of signal lines in a case where control data is written to the register in each light-emitting chip 400. To the signal line EN, an enable signal that switches to a high level and indicates that communication is being performed is output during communication. The data switching unit 705 transmits a start bit to the signal line WRITEn in synchronization with the rising edge of the enable signal. The data switching unit 705 subsequently transmits a write identification bit indicating a writing operation. Then, the data switching unit 705 transmits the address (4 bits in this example) of the register to which control data is to be written and the control data (8 bits in this example). The start bit, the write identification bit, and the address are command data instructing the register to perform an operation. The amount of control data is smaller than the amount of image data, and therefore, the frequency of a clock signal to be output to the signal line CLK when the control data is transmitted can be made lower than that when image data is transmitted. In this example, the frequency of a clock signal when control data is read or written is 3 MHz.

Figure 10:
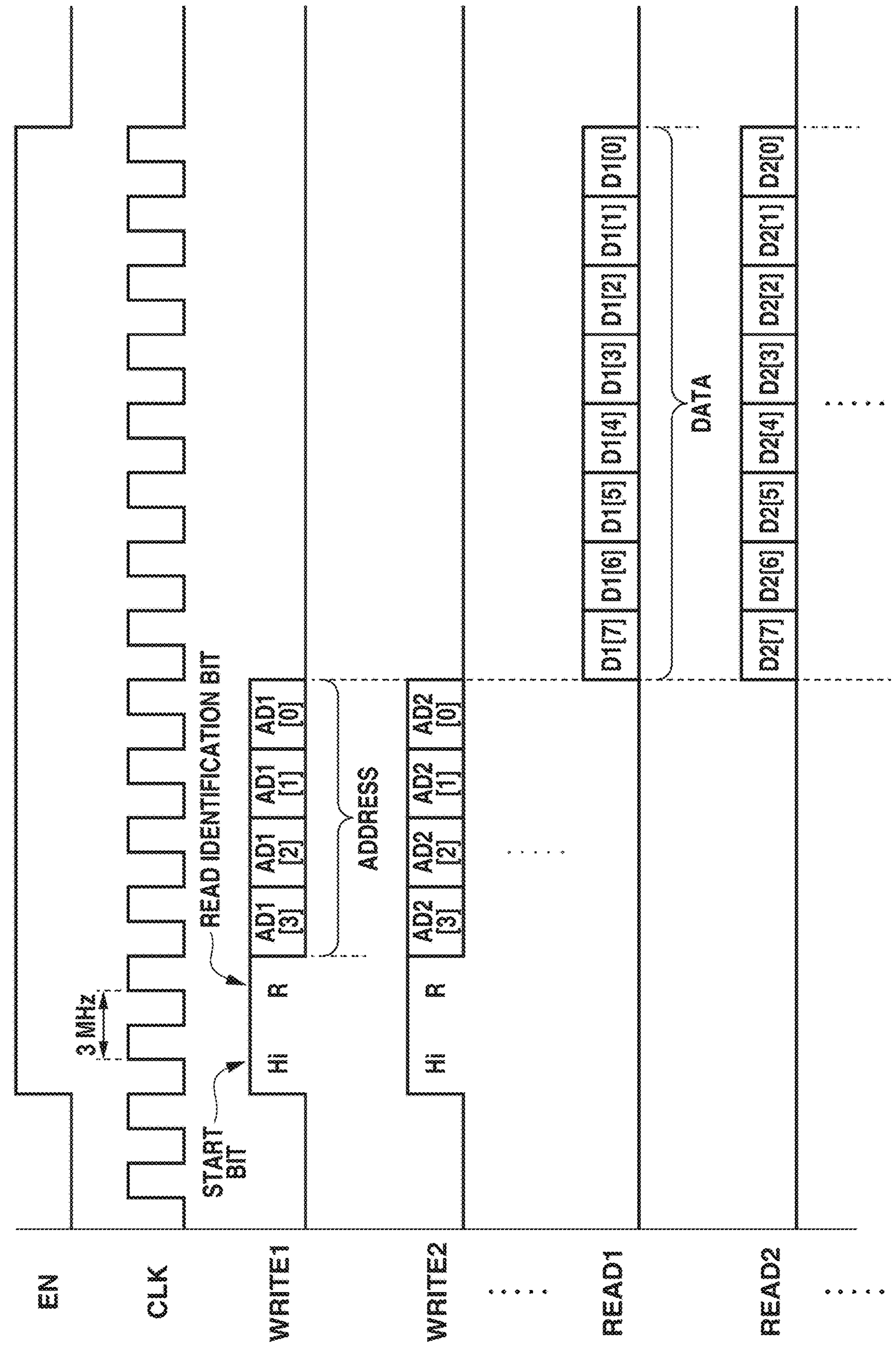
FIG. 10 is a diagram illustrating examples of signals of signal lines when control data is read from the register in the light-emitting chip.

FIG. 10 illustrates signals of signal lines in a case where control data stored in the register in each light-emitting chip 400 is read. To the signal line EN, an enable signal that switches to a high level and indicates that communication is being performed is output during communication. The data switching unit 705 transmits a start bit to the signal line WRITEn in synchronization with the rising edge of the enable signal. The data switching unit 705 subsequently transmits a read identification bit indicating a reading operation after the start bit. Then, the data switching unit 705 transmits the address of the register from which control data is to be read.

The start bit, the read identification bit, and the address are command data instructing the register to perform an operation. In response to the command data, the light-emitting chip 400-*n* reads the control data stored at the address specified by the command from the register and outputs the control data to the signal line READn.

Figure 11:
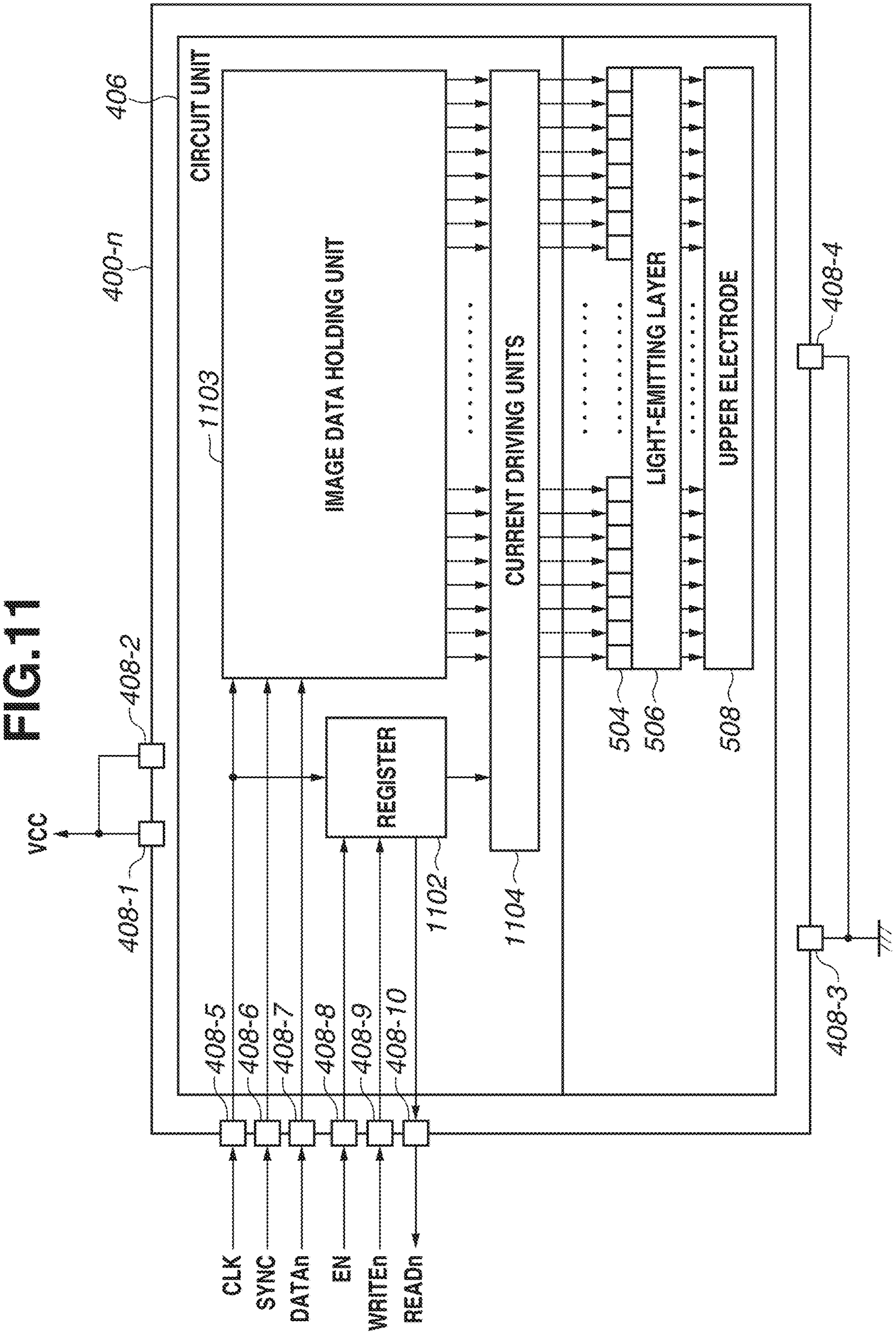
FIG. 11 is a functional block diagram of the light-emitting chip.

FIG. 11 is a functional block diagram of the single light-emitting chip 400-*n*. As also illustrated in FIG. 5, each light-emitting chip 400 includes the ten pads 408-1 to 408-10. The pads 408-1 and 408-2 are connected to a power supply voltage VCC by power supply lines. To circuits of the circuit unit 406 of the light-emitting chip 400, power based on the power supply voltage VCC is supplied. The pads 408-3 and 408-4 are connected to the ground by ground lines.

The circuits of the circuit unit 406 and the upper electrode 508 are connected to the ground via the pads 408-3 and 408-4. The signal lines CLK, SYNC, and DATAn are connected to an image data holding unit 1103 via the pads 408-5 to 408-7. The image data holding unit 1103 and the pads 408-5 to 408-7 are connected to each other by signal lines corresponding to the signal lines CLK, SYNC, and DATAn. The signal lines EN, WRITEn, and READn are connected to a register (hereinafter also referred to as a register unit) 1102 via the pads 408-8 to 408-10. The register 1102 and the pads 408-8 to 408-10 are connected to each other by signal lines corresponding to the signal lines EN, WRITEn, and READn. A clock signal from the signal line CLK is also input to the register 1102. As described above, the register 1102 stores control data indicating control information. The details of the control information will be described below.

If the image data holding unit 1103 receives image data corresponding to the light-emitting points 602, the image data holding unit 1103 generates driving signals for controlling the light emission of the light-emitting points 602 based on the image data corresponding to the light-emitting points 602 and outputs the driving signals to current driving units 1104.

Figure 12:
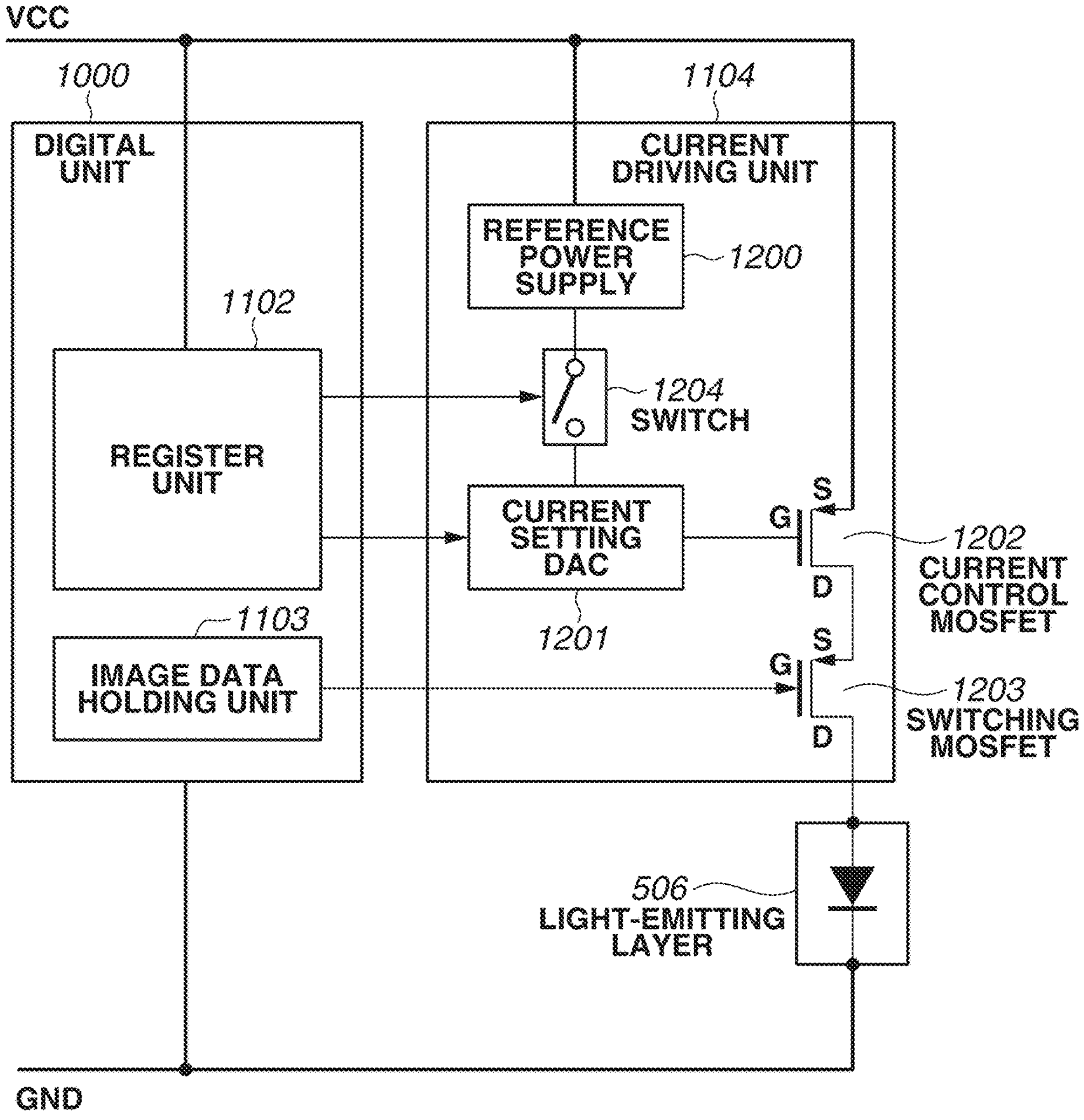
FIG. 12 is a diagram illustrating a configuration of a current driving unit.

FIG. 12 is a diagram illustrating the configuration of each driving unit 1104. The driving units 1104 are connected to the light-emitting points 602 on a one-to-one basis. Although a single driving unit 1104 is described for ease of description in the present exemplary embodiment, there are as many similar driving units 1104 as the number of light-emitting points 602. That is, in the present exemplary embodiment, there are 748×4 columns=2992 driving circuits for a single light-emitting element array chip.

Each driving unit 1104 includes a reference power supply 1200, a switch 1204, a digital-to-analog converter (DAC) 1201, a control metal-oxide-semiconductor field-effect transistor (MOSFET) 1202, and a switching MOSFET 1203. The driving unit 1104 corresponds to a driving unit.

The reference power supply 1200 outputs a reference voltage and a reference current to be used by the driving unit 1104 based on the voltage VCC supplied from the power supply. That is, the reference power supply 1200 corresponds to a voltage source. The DAC 1201 receives control data stored in a register unit 1102 as a digital value and divides the reference voltage, thereby generating a voltage (=an analog value) according to the digital value based on the reference voltage. Then, the DAC 1201 outputs the generated voltage. That is, the control data corresponds to a digital signal.

The switch 1204 is configured to switch between on and off states according to an instruction from the register unit 1102. If the switch 1204 is on, the reference voltage output from the reference power supply 1200 is supplied to the DAC 1201. If the switch 1204 is off, an electrical connection between the reference power supply 1200 and the DAC 1201 is disconnected, and the reference current and the reference voltage are not supplied to the DAC 1201. That is, the on state of the switch 1204 corresponds to a first state, and the off state of the switch 1204 corresponds to a second state. The on and off states of the switch 1204 are switched, whereby it is possible to switch the connection state between the reference power supply 1200 and the switch 1204. When the switch 1204 is off, the DAC 1201 does not consume power, and therefore, the power consumption of the light-emitting chip 400 is reduced, and the heat generation of the light-emitting chip 400 is reduced. Each of the reference power supply 1200, the DAC 1201, and the switch 1204 may be a single common circuit for a plurality of light-emitting points 602.

The control MOSFET 1202 according to the present exemplary embodiment is a P-channel MOSFET. The source terminal of the control MOSFET 1202 is connected to the power supply voltage VCC, and the gate terminal of the control MOSFET 1202 is connected to the output of the DAC 1201. The control MOSFET 1202 has a configuration in which the greater a current flowing from the DAC 1201 to the gate is, the greater a current flowing from the source to the drain is.

In the present exemplary embodiment, the switching MOSFET 1203 is also a P-channel MOSFET. The source terminal of the switching MOSFET 1203 is connected to the drain terminal of the control MOSFET 1202. To the gate terminal of the switching MOSFET 1203, a driving signal output from the image data holding unit 1103 is input. The driving signal is a binary signal indicating a high level or a low level. When the high level signal is input, the switching MOSFET 1203 is turned on, and a current controlled by the control MOSFET 1202 flows from the source to the drain of the switching MOSFET 1203. The drain terminal of the switching MOSFET 1203 is connected to the light-emitting layer 506 via the lower electrode 504. If the current flows through the drain terminal, the light-emitting point 602 emits light. The light emission intensity of the light-emitting point 602 changes according to a current flowing through the light-emitting layer 506. The value of the current is controlled by an analog voltage output from the DAC 1201. That is, the light emission intensities of the respective light-emitting points 602 are controlled by control data stored in the register 1102. The control data may individually indicate a digital value set for each of the DACs 1201 corresponding to the light-emitting points 602, or may indicate a single digital value set for a group of a plurality of light-emitting points 602.

Figure 13:
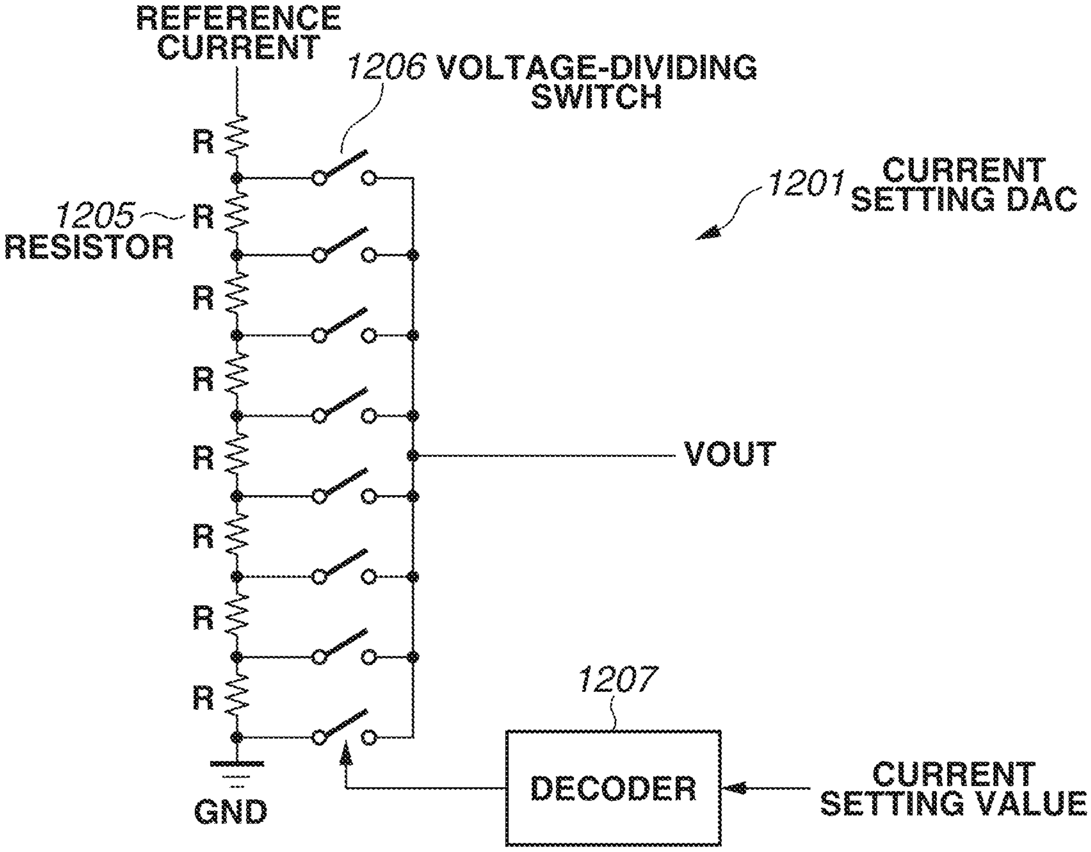
FIG. 13 is an example of a circuit diagram of a digital-to-analog converter (DAC) for setting a current.

FIG. 13 is a diagram illustrating an example of a circuit of the DAC 1201. The DAC 1201 includes a plurality of resistors 1205, as many voltage-dividing switches 1206 as the resistors 1205, and a decoder 1207. A reference current generated by the reference power supply 1200 flows to the ground via the plurality of resistors 1205 connected together in series. To the resistors 1205, the voltage-dividing switches 1206 are connected.

The decoder 1207 turns on any of the voltage-dividing switches 1206 according to a setting value received from the register unit 1102. As a result, as many resistors 1205 as the number corresponding to the positions of the voltage-dividing switches 1206 that are turned on divide a reference voltage, and the divided voltage (an analog value) is output from the DAC 1201. That is, the DAC 1201 corresponds to a D/A converter. If the reference voltage is supplied to the DAC 1201 regardless of whether or not the light-emitting point 602 emits light, the resistors 1205 generate Joule heat due to the supply of the voltage to the resistors 1205. In the present exemplary embodiment, when the switch 1204 is turned off, the reference voltage is not supplied to the DAC 1201. Thus, the resistors 1205 are prevented from generating Joule heat. That is, the DAC 1201 is prevented from generating heat. The DAC 1201 illustrated in FIG. 13 is an example of a D/A converter according to the present exemplary embodiment. The D/A converter may use a method for dividing a reference voltage using a switching element without using a resistor. That is, the D/A converter may use another method such as a method for receiving a digital signal and outputting an analog signal.

Figure 14:
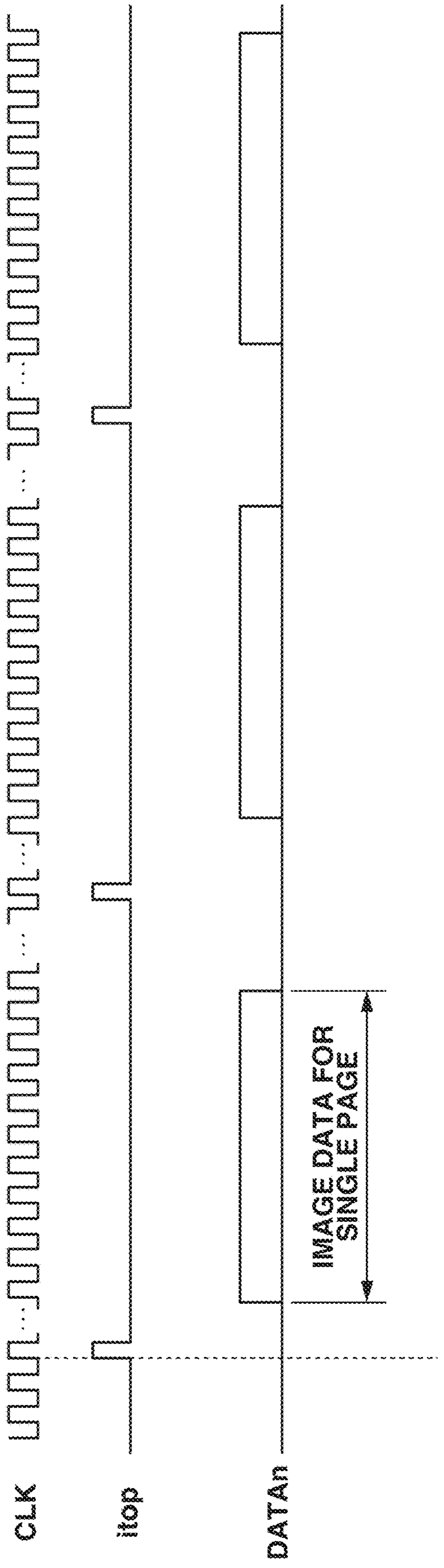
FIG. 14 is a timing chart of various signals when printing is performed.

FIG. 14 illustrates a timing chart of signals in the image controller unit 700 in a case where a printing request is received from a user. For simplicity, FIG. 14 illustrates a timing chart of signals in a case where an image is formed in a single color.

If a device controller unit 708 receives a printing request from the user, the device controller unit 708 confirms whether a predetermined condition under which the reading unit 100, the image formation device 103, and the fixing unit 104 can perform printing is satisfied. Examples of the predetermined condition include whether the temperature of the fixing unit 104 satisfies a predetermined temperature at which an image can be fixed. If the device controller unit 708 confirms that the predetermined condition under which the reading unit 100, the image formation device 103, and the fixing unit 104 can perform printing is satisfied, the device controller unit 708 transmits an itop signal to the image controller unit 700. The itop signal is a signal transmitted from the device controller unit 708 to the image controller unit 700 based on an instruction given by the user to instruct the image forming apparatus to start an image forming job. That is, the device controller unit 708 corresponds to a transmission unit.

The image controller unit 700 having received the itop signal from the device controller unit 708 transmits pieces of image data corresponding to the light-emitting chips (400-1 to 400-20) after a predetermined time elapses. The turning on of the light-emitting chips (400-1 to 400-20) is controlled based on the received pieces of image data, and a latent image is formed on the surface of the photosensitive drum by light emitted from the light-emitting chips 400. That is, the image controller unit 700 starts the transmission of the image data to each light-emitting chip 400 based on the timing when the image controller unit 700 receives the itop signal. That is, the itop signal corresponds to a reference signal. The image data corresponds to an image signal.

In a case where an image forming job for successively forming images on a plurality of recording media is executed, a latent image for a single page of image data is formed on the surface of the photosensitive drum, and after an interval of a predetermined time, a next itop signal is transmitted. If the rotational speed of the photosensitive drum is constant, then based on the lapse of a first time that is a predetermined time after the image controller unit 700 receives the itop signal, the image controller unit 700 determines that the formation of a latent image for a single page of image data is completed. That is, the timing when the first time elapses after the image controller unit 700 receives the itop signal corresponds to a first timing. The first time is defined by, for example, the image controller unit 700 transmitting a predetermined number of CLK signals to the light-emitting chip 400.

At the first timing that is the timing when the formation of the image for the single page is completed, the image controller unit 700 transmits register data for turning off the switch 1204 to the register unit 1102 in the light-emitting chip 400. That is, the image controller unit 700 corresponds to a control unit. The switch 1204 that is switched to the off state by the image controller unit 700 maintains in the off state until the switch 1204 is switched to the on state by the image controller unit 700. By the above processing, the image controller unit 700 can determine that the formation of the image for the single page is completed, and block a voltage supplied to the DAC 1201 during the period when the light-emitting units 602 do not need to emit light.

The image controller unit 700 transmits image data for a single page to the image data holding unit 1103 with respect to each line in the sub-scanning direction. The image controller unit 700 may determine that the formation of a latent image for the single page is completed upon completion of the transmission of image data of the last line in the sub-scanning direction in a single page to the image data holding unit 1103. That is, the timing when the transmission of the image data of the last line in the sub-scanning direction in the single page to the image data holding unit 1103 is completed may be the first timing.

In the image forming apparatus according to the present exemplary embodiment, in the conveying direction of a recording medium, a registration sensor (not illustrated) is installed immediately before the registration rollers 110 on the conveying path of the recording medium. Based on the lapse of a third time that is a predetermined time after the registration sensor detects the front end of the recording medium, it may be determined that the formation of an image for a single page is completed. That is, the registration sensor corresponds to a detection unit. The timing when the third time elapses after the registration sensor detects the front end of the recording medium corresponds to a third timing. The third time is a time in which, when the third time elapses after the registration sensor detects the front end of the recording medium, an image is formed on the recording medium based on a latent image formed on the photosensitive drum. The third time is defined by, for example, the image controller unit 700 transmitting a predetermined number of CLK signals to the light-emitting chip 400.

Based on the lapse of a second time that is a predetermined time after the image controller unit 700 receives the itop signal, the image controller unit 700 determines that the formation of an image for a single page of image data in a next page is started. That is, the timing when the second time elapses after the image controller unit 700 receives the itop signal corresponds to a second timing. The second time is longer than the first time and is defined by, for example, the image controller unit 700 transmitting a predetermined number of CLK signals to the light-emitting chip 400.

At the second timing that is the timing when the formation of the image for the next page is started, the image controller unit 700 transmits register data for turning on the switch 1204 to the register unit 1102 in the light-emitting chip 400. The switch 1204 that is switched to the on state by the image controller unit 700 maintains in the on state until the switch 1204 is switched to the off state by the image controller unit 700. By the above processing, the image controller unit 700 can determine that the formation of the image for the next page is started, and supply a current to the DAC 1201 during the period when the light-emitting units 602 need to emit light.

The image controller unit 700 transmits image data for a single page to the image data holding unit 1103 with respect to each line in the sub-scanning direction. The image controller unit 700 may determine that the formation of a latent image for the next page is started upon the transmission of image data of the first line in the sub-scanning direction in a next page to the image data holding unit 1103. That is, the timing when the transmission of the image data of the first line in the sub-scanning direction in the next page to the image data holding unit 1103 is started may be the second timing.

Based on the lapse of a fourth time that is a predetermined time after the registration sensor detects the front end of the recording medium, it may be determined that the formation of an image for a single page is completed. That is, the timing when the fourth time elapses after the registration sensor detects the front end of the recording medium corresponds to a fourth timing. The fourth time is defined by, for example, the image controller unit 700 transmitting a predetermined number of CLK signals to the light-emitting chip 400.

The image controller unit 700 performs the above processing, thereby disconnecting the supply of a reference voltage to the DAC 1201 during the period when the light-emitting chip 400 does not emit light, and preventing the resistors 1205 from generating Joule heat. Thus, it is possible to prevent the DAC 1201 from generating heat.

In the present exemplary embodiment, the timing when the register data for turning off the switch 1204 is transmitted to the register unit 1102 in the light-emitting chip 400 is the first timing. The timing when the switch 1204 is turned off, however, is not limited to this, and may be another timing. The timing when the switch 1204 is turned off may be, for example, any timing during the period between the first and second timings.

In the present exemplary embodiment, the timing when the register data for turning on the switch 1204 is transmitted to the register unit 1102 in the light-emitting chip 400 is the second timing. The timing when the switch 1204 is turned on, however, is not limited to this, and may be another timing. The timing when the switch 1204 is turned on may be, for example, any timing during the period between the timing when the switch 1204 is turned off and the second timing.

That is, during the period between first and second periods, the period when the switch 1204 switches to the off state corresponds to the first period. The start point of the first period may be the timing when the third time elapses after the registration sensor detects the front end of the recording medium. Further, the end point of the first period may be the timing when the fourth time elapses after the registration sensor detects the front end of the recording medium.

Figure 15:
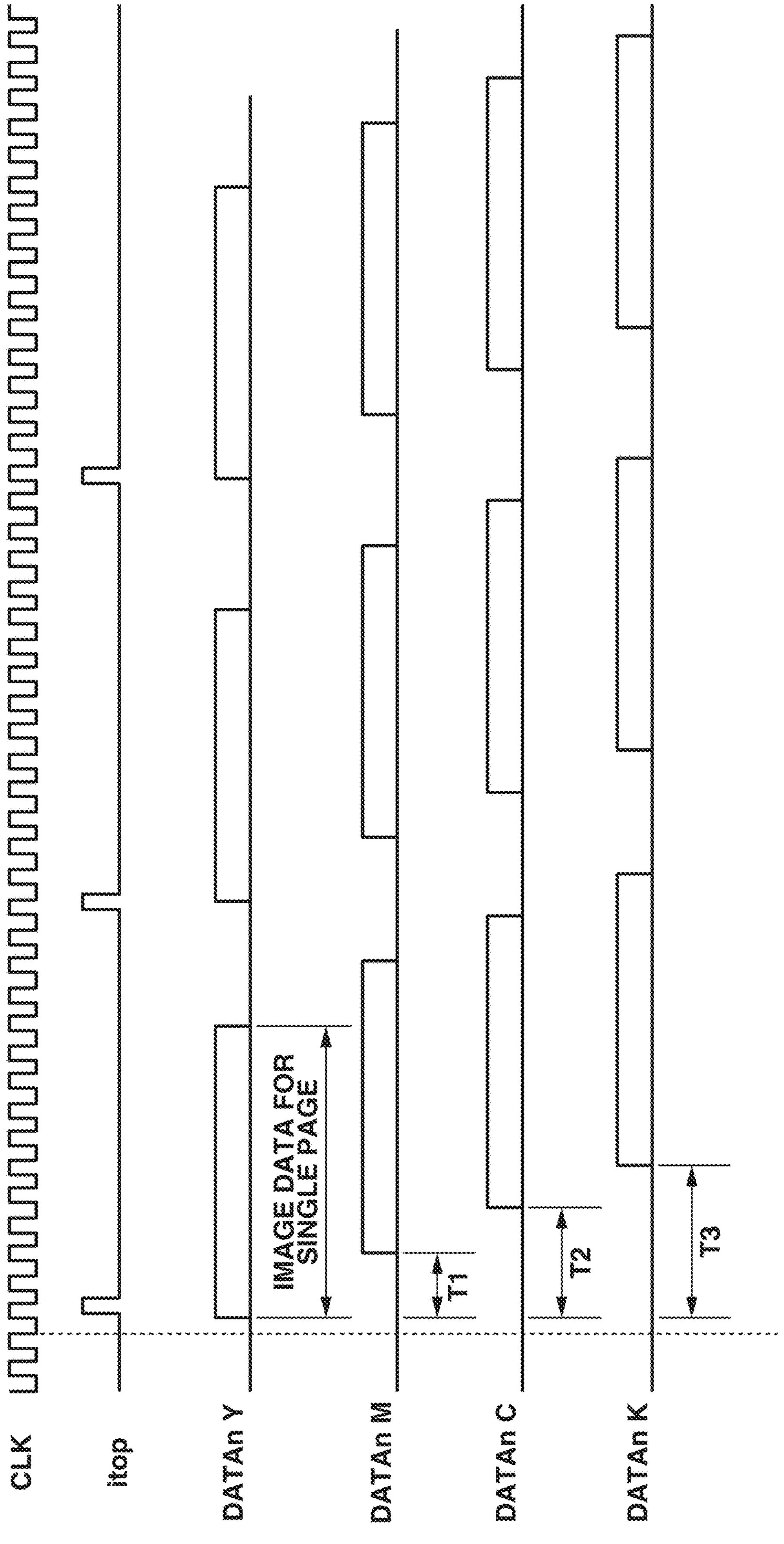
FIG. 15 is a timing chart of various signals when printing is performed.

FIG. 15 is a timing chart of signals in a case where an image is formed in four colors: yellow (Y), magenta (M), cyan (C), and black (K). In a case where a color image is formed, the image forming units 101*a*, 101*b*, 101*c*, and 101*d* corresponding to yellow (Y), magenta (M), cyan (C), and black (K) in the image formation device 103 are arranged in the direction in which a recording medium is conveyed. The four image forming units 101*a*, 101*b*, 101*c*, and 101*d* start the formation of a yellow toner image, and after the lapses of predetermined times, sequentially form magenta, cyan, and black toner images. Times T1, T2, and T3 in FIG. 15 correspond to the predetermined times for magenta, cyan, and black, respectively. After the lapses of the times T1, T2, and T3 after the yellow toner image is formed, the magenta, cyan, and black toner images are formed, whereby it is possible to form a color image without color misregistration on the recording medium. Even in a case where a color image is formed, after the lapses of the times T1, T2, and T3 after a yellow image is formed, processing similar to that in FIG. 14 is performed for magenta, cyan, and black colors, whereby it is possible to prevent the driving units 1104 from generating heat.

Figure 16:
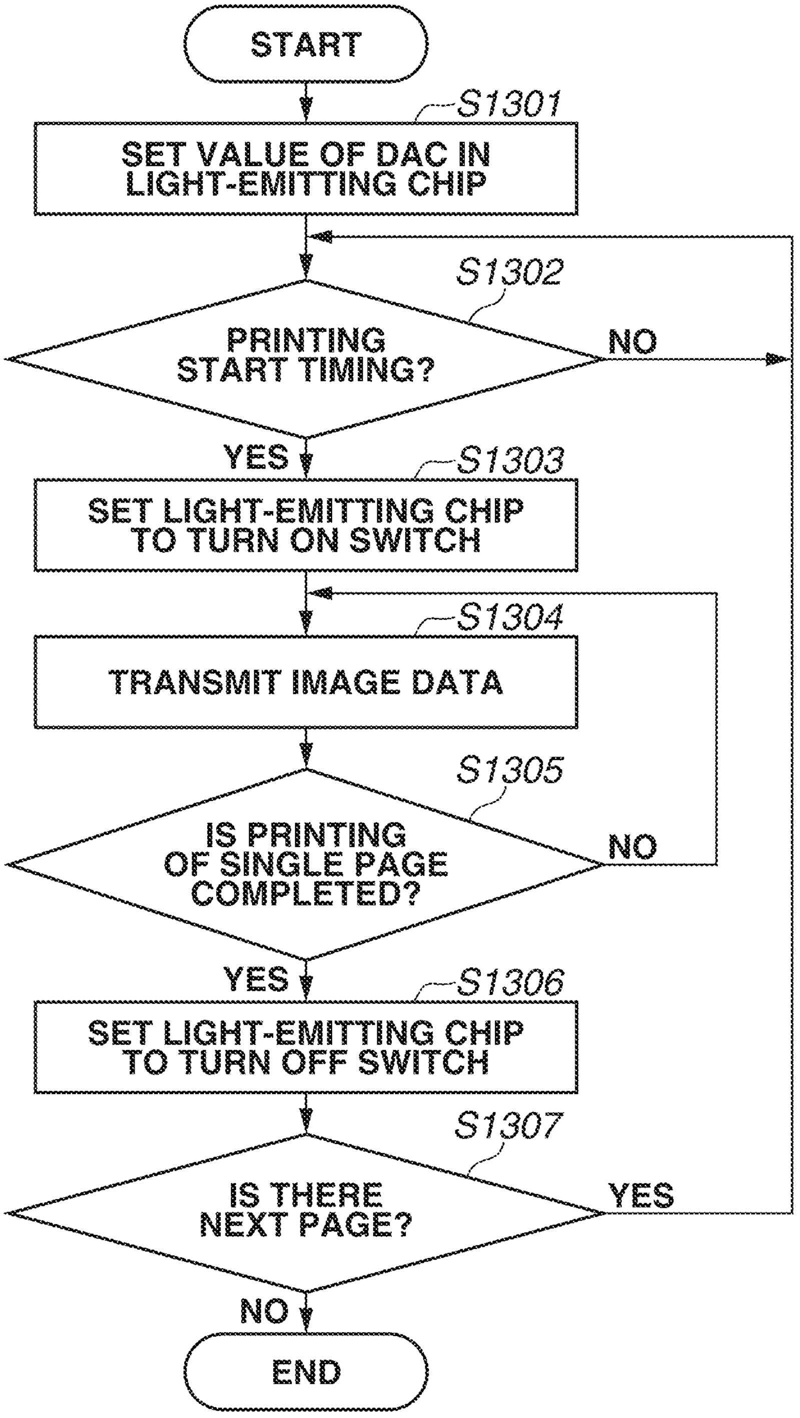
FIG. 16 is a flowchart of processing executed by an image controller.

FIG. 16 is a flowchart of control of the image controller unit 700 over the register 1102 included in each light-emitting chip 400 in a case where a printing request is received from the user.

If a printing request is received from the user, then in step S1301, the image controller unit 700 writes register data including the setting value of the DAC 1201 to the register unit 1102 in the light-emitting chip 400.

In step S1302, based on the transmission of a predetermined number of CLK signals to the light-emitting chip 400 after the image controller unit 700 receives an itop signal, the image controller unit 700 determines that the current timing is a printing start timing (YES in step S1302), and the processing proceeds to step S1303.

In step S1303, before the printing starts, the image controller unit 700 sets the register unit 1102 in the light-emitting chip 400 to turn on the switch 1204.

In step S1304, the image controller unit 700 transmits pieces of image data that is based on an image file indicated by the user to the 20 light-emitting chips 400. The image controller unit 700 continues to transmit the pieces of image data until the printing of a single page is completed.

In step S1305, upon the transmission of CLK signals for a predetermined period after the image controller unit 700 receives the itop signal, the image controller unit 700 determines that the printing of the single page is completed (YES in step S1305), and the processing proceeds to step S1306.

In step S1306, the image controller unit 700 sets the register unit 1102 in the light-emitting chip 400 to turn off the switch 1204.

In step S1307, if the registration sensor installed immediately before the registration rollers 110 in the recording medium conveying direction detects the front end of a recording medium, the registration sensor transmits information indicating that the front end of a recording medium is detected to the image controller unit 700. Based on the information indicating that the front end of a recording medium is detected, the image controller unit 700 determines that there is a next page. If it is determined that there is a next page (YES in step S1307), the processing returns to step S1302. Then, the image controller unit 700 executes steps S1302 to S1307.

In step S1307, if the registration sensor (not illustrated) installed immediately before the registration rollers 110 in the recording medium conveying direction does not detect the front end and the rear end of a recording medium even after a predetermined time elapses, the registration sensor transmits information indicating that the front end and the rear end of a recording medium are not detected to the image controller unit 700. Based on the information indicating that the front end and the rear end of a recording medium are not detected within the predetermined time, the image controller unit 700 determines that there is not a next page (NO in step S1307), and the printing operation ends.

In the present exemplary embodiment, in a configuration in which light-emitting units and driving circuits are formed on the same chip, the supply of a current to the DAC 1201 included in each of the driving circuits of the light-emitting chips 400 is disconnected at the timing when printing is not performed, such as a timing between pages. Thus, it is possible to prevent the DAC 1201 included in each of the driving circuits of the exposure head 106 from generating heat. That is, it is possible to prevent a D/A converter that converts a digital signal into a voltage from generating heat.

Figure 17:
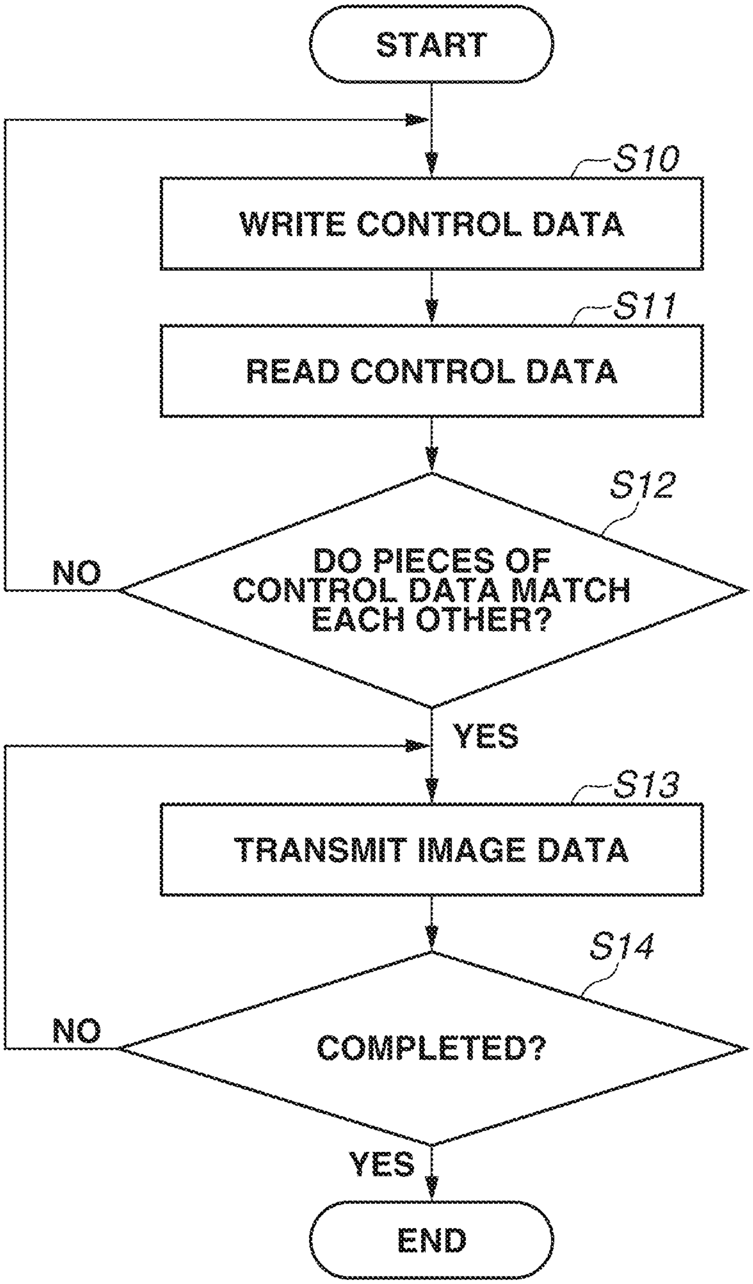
FIG. 17 is a flowchart of processing executed by the image controller.

FIG. 17 is a flowchart of processing regarding the writing of control data and the reading of control data that is executed by the image controller 700 in a case where a printing request is received from the user. In step S10, the image controller 700 writes pieces of control data to the registers 1102 in the light-emitting chips 400 in parallel using signal lines WRITE1 to WRITE20. The pieces of control data include data for controlling the light emission intensities of the light-emitting points 602. In step S11, the image controller 700 inspects whether the pieces of control data are correctly written in the registers 1102. Specifically, in step S11, the image controller 700 reads pieces of control data stored in the registers 1102 in the light-emitting chips 400 in parallel using the signal lines WRITE1 to WRITE20 and signal lines READ1 to READ20. In step S12, if the pieces of control data written in step S10 and the pieces of control data read from the registers 1102 in step S11 do not match each other (NO in step S12), the image controller 700 repeats the processing from step S10. A configuration can also be employed in which the upper limit of the number of times of repetition of each of steps S10 and S11 is set in advance, and if the number of times of repetition reaches the upper limit, the processing in FIG. 17 is stopped, and the user is notified of an error.

If the pieces of control data written in step S10 and the pieces of control data read from the registers 1102 in step S11 match each other (YES in step S12), the processing proceeds to step S13 at the start timing of the formation of an image. In step S13, the image controller 700 transmits pieces of image data to the light-emitting chips 400 in parallel using the signal lines WRITE1 to WRITE20. In step S14, the image controller 700 determines whether the formation of the image is completed. If the formation of the image is not completed (NO in step S14), the image controller 700 repeats the processing from step S13. If, on the other hand, the formation of the image is completed (YES in step S14), the processing in FIG. 17 ends.

Figure 18:
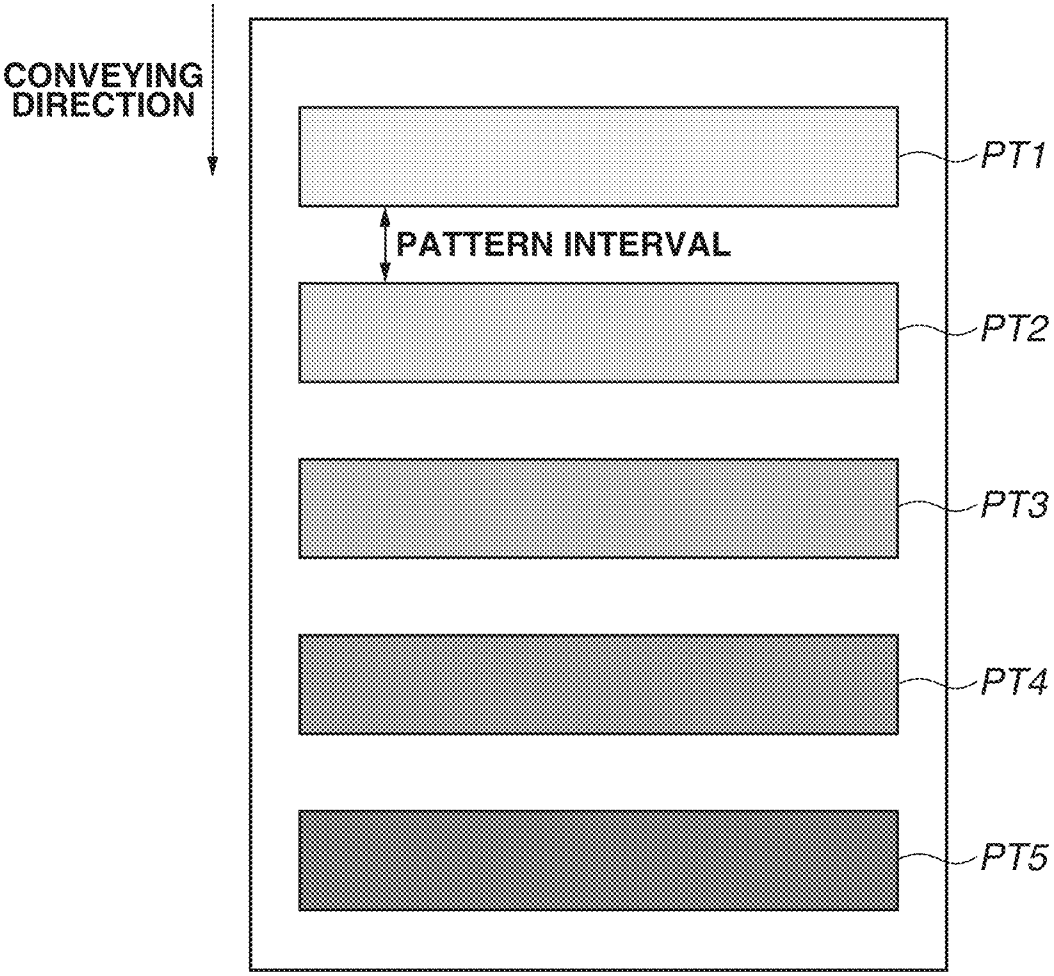
FIG. 18 is a diagram illustrating a test pattern for gradation correction control.

The image forming apparatus also performs gradation correction control. For example, the image forming apparatus forms a test pattern for the gradation correction control on a sheet. FIG. 18 illustrates an example of the test pattern used in the present exemplary embodiment. As illustrated in FIG. 18, the test pattern includes five test images PT1 to PT5 having different densities. In the conveying direction of the sheet, intervals (pattern intervals) are provided between the test images PT1 to PT5. The user operates the image forming apparatus to cause the reading unit 100 to read the sheet on which the test pattern is formed. Consequently, the image forming apparatus detects the density of each of the test images PT1 to PT5 included in the test pattern and corrects an image forming condition regarding the density so that the density of each of the test images PT1 to PT5 comes close to a target density. Specifically, for example, the image controller 700 rewrites pieces of control data so that the density of each of the test images PT1 to PT5 comes close to the target density.

Figure 19:
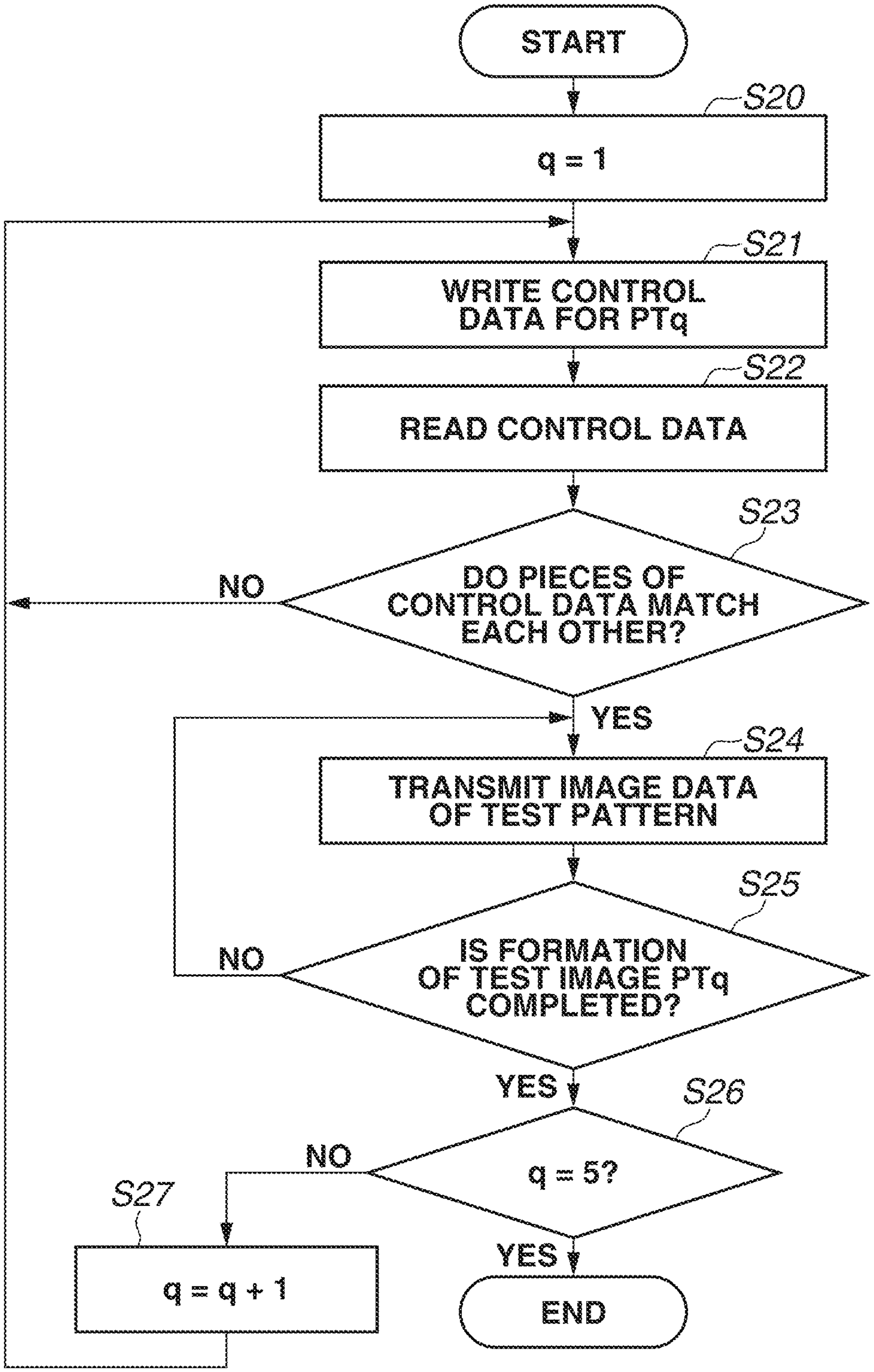
FIG. 19 is a flowchart of processing executed by the image controller.

FIG. 19 is a flowchart of processing executed by the image controller 700 when the test pattern is formed. In step 520, the image controller 700 initializes an index q of a test image to 1. In step S21, the image controller 700 writes pieces of control data for forming a test image PTq to the registers 1102 in the light-emitting chips 400 in parallel using the signal lines WRITE1 to WRITE20. The pieces of control data include data for controlling the light emission intensities of the light-emitting points 602. The data for controlling the light emission intensities of the light-emitting points 602 may be referred to also as data regarding the magnitude of a voltage that is to be applied to the electrodes 504 and 508 or data regarding the magnitude of a current that is to be supplied to the organic EL film. In step S22, the image controller 700 inspects whether the pieces of control data are correctly written in the registers 1102. Specifically, in step S22, the image controller 700 reads pieces of control data stored in the registers 1102 in the light-emitting chips 400 in parallel using the signal lines WRITE1 to WRITE20 and the signal lines READ1 to READ20. In step S23, if the pieces of control data written in step S21 and the pieces of control data read from the registers 1102 in step S22 do not match each other (NO in step S23), the image controller 700 repeats the processing from step S21. A configuration can also be employed in which the upper limit of the number of times of repetition of each of steps S21 and S22 is set in advance, and if the number of times of repetition reaches the upper limit, the processing in FIG. 19 is stopped, and the user is notified of an error.

If the pieces of control data written in step S21 and the pieces of control data read from the registers 1102 in step S22 match each other (YES in step S23), the processing proceeds to step S24 at the start timing of the formation of an image. In step S24, the image controller 700 transmits pieces of image data on the test pattern to the signal lines DATA1 to DATA20 in parallel and starts the exposure of the photosensitive member 102. In step S25, the image controller 700 determines whether the formation of the test image PTq is completed. If the formation of the test image PTq is not completed (NO in step S25), the image controller 700 repeats the processing from step S24. If, on the other hand, the formation of the test image PTq is completed (YES in step S25), then in step S26, the image controller 700 determines whether q=5 holds true. If q=5 does not hold true (NO in step S26), since the formation of all the test images PT1 to PT5 of the test pattern is not completed, then in step S27, the image controller 700 increases the index q by 1. Then, the image controller 700 repeats the processing from step S21. If, on the other hand, q=5 holds true (YES in step S26), the processing in FIG. 19 ends.

In the present exemplary embodiment, the pieces of control data set in the registers 1102 in step S21 vary the light emission intensities of the light-emitting points 602 according to the densities of the test images PT1 to PT5 to be formed. Thus, the pieces of image data on the test pattern transmitted in step S24 can be the same regardless of the test images PT1 to PT5 to be formed.

As described above, the image controller 700 and each of the plurality of light-emitting chips 400 are individually connected to each other via the dedicated signal line WRITEn and the dedicated signal line READn so that the image controller 700 can access the registers 1102 in the plurality of light-emitting chips 400 in parallel. With this configuration, it is possible to shorten the time of transmission of pieces of control data to the light-emitting chips 400 as compared to a case where the image controller 700 sequentially accesses the light-emitting chips 400 using a single signal line WRITE and a single signal line READ. Moreover, it is possible to change the exposure intensities in a short time by rewriting pieces of control data in the registers 1102. Thus, when a plurality of test images having different densities is formed, it is possible to reduce the intervals between the test images in the conveying direction of a sheet. Accordingly, it is possible to increase the number of test images that can be formed on a sheet, and it is possible to decrease the number of sheets (or the number of pages) for forming a test pattern.

Although the image controller 700 and each of the plurality of light-emitting chips 400 are individually connected to each other via the dedicated signal line WRITEn and the dedicated signal line READn in the present exemplary embodiment, the connection method is not limited to this. For example, a configuration may be employed in which there is a plurality of light-emitting chip groups included in the plurality of light-emitting chips 400, and each of the plurality of light-emitting chip groups and the image controller 700 are connected to each other via the dedicated signal line WRITEn and the dedicated signal line READn. At this time, the number of light-emitting chip groups is not limited to two, and may be three or more. Further, the number of light-emitting chips 400 included in each light-emitting chip group may differ among the light-emitting chip groups, and there may be a case where the number of light-emitting chips 400 included in a light-emitting chip group is one. The dedicated signal line WRITEn and the dedicated signal line READn are shared in a light-emitting chip group, whereby it is possible to decrease the number of signal lines as compared to a case where the image controller 700 and each of the plurality of light-emitting chips 400 are individually connected to each other via the dedicated signal line WRITEn and the dedicated signal line READn. Thus, it is possible to reduce the manufacturing cost of the exposure head 106.

Figure 20:
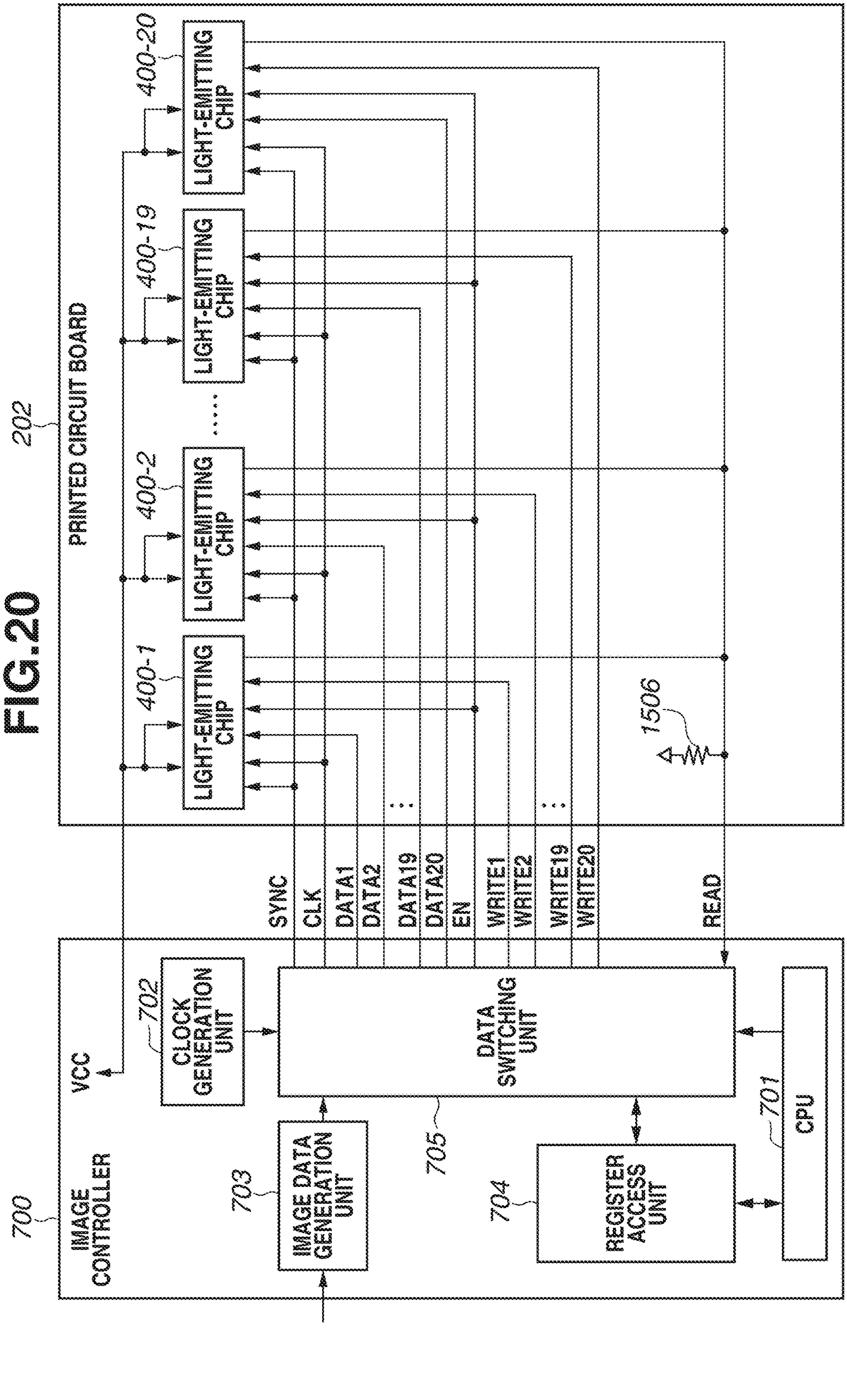
FIG. 20 is a diagram illustrating a control configuration of a light-emitting chip.

Next, a second exemplary embodiment will be described mainly based on the differences from the first exemplary embodiment. FIG. 20 illustrates the control configuration of each light-emitting chip 400 according to the present exemplary embodiment. In the first exemplary embodiment, the signal lines READ1 to READ20 are provided for the light-emitting chips 400-1 to 400-20 on a one-to-one basis. In the present exemplary embodiment, a common signal line READ is used for all the light-emitting chips 400-1 to 400-20. More specifically, a single (common) signal line READ is connected to the data switching unit 705 of the image controller 700. In the printed circuit board 202, a total of 20 signal lines (hereinafter "in-substrate signal lines READ") from the light-emitting chips 400-1 to 400-20 are connected to the single signal line READ. In the printed circuit board 202, the single signal line READ is pulled up to a predetermined first potential via a pull-up resistor 1506.

Figure 21:
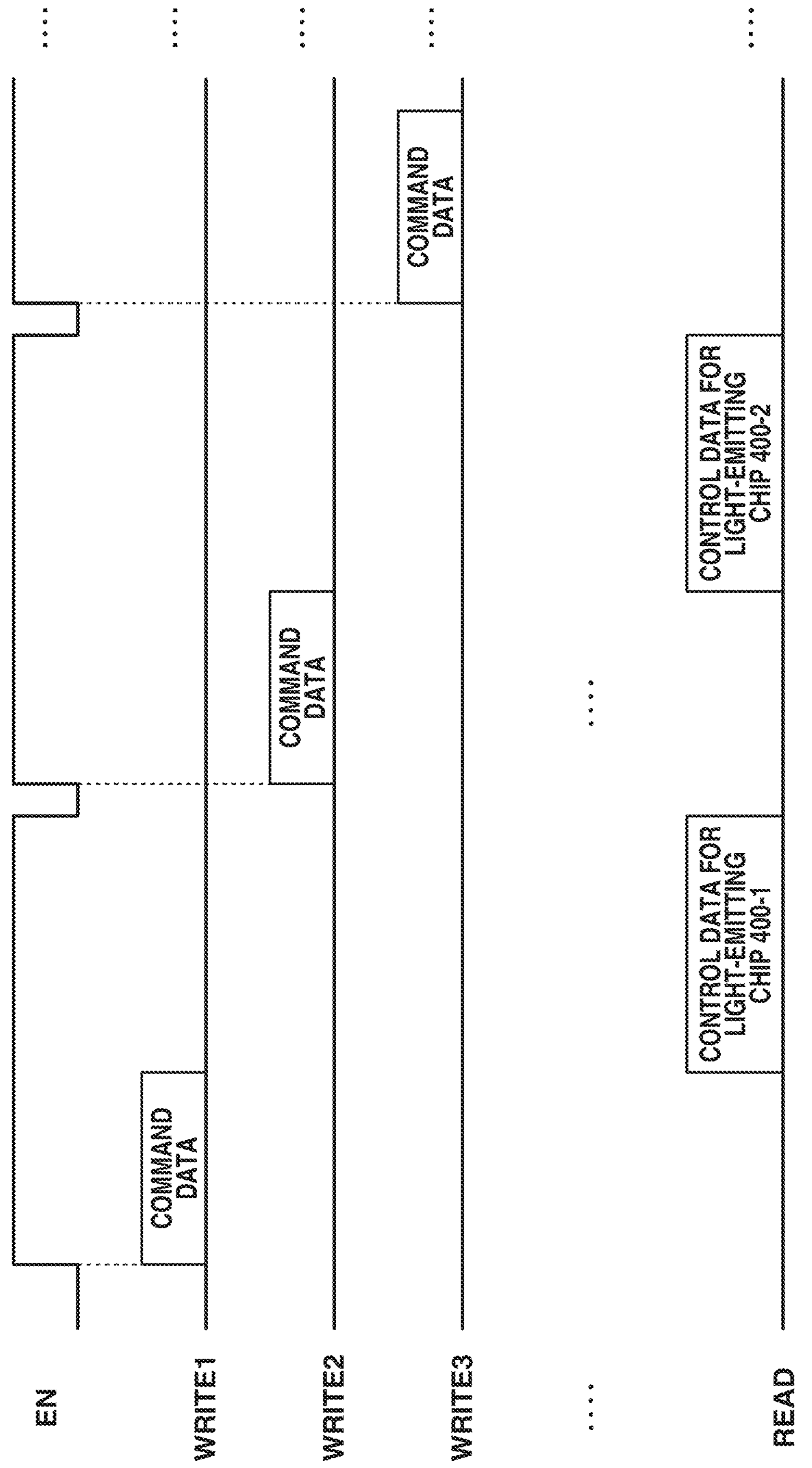
FIG. 21 is a diagram illustrating examples of signals of signal lines when control data is read from a register in the light-emitting chip.

FIG. 21 illustrates a timing chart when pieces of control data are read from the registers 1102 in the light-emitting chips 400-1 to 400-20. To read control data from the register 1102 in the light-emitting chip 400-1, the image controller 700 transmits command data to the signal line WRITE1 in synchronization with the rising edge of an enable signal in the signal line EN. When a start bit (a high level) of the command data is transmitted to the signal line WRITE1, the signal lines WRITE2 to WRITE20 are fixed to a low level. That is, the start bit is transmitted to only the signal line WRITE1 and is not transmitted to the signal lines WRITE2 to WRITE20. In response to the command data from the image controller 700, the register 1102 in the light-emitting chip 400-1 reads control data stored at the address specified by the command data and outputs the control data to the signal line READ. Next, to read control data from the register 1102 in the light-emitting chip 400-2, the image controller 700 transmits command data to the signal line WRITE2 in synchronization with the rising edge of the enable signal in the signal line EN. In response to the command data from the image controller 700, the register 1102 in the light-emitting chip 400-2 reads control data stored at the address specified by the command data and outputs the control data to the signal line READ. The image controller 700 repeats a similar process on the light-emitting chips 400-3 to 400-20. The transmission of image data and the writing of control data are similar to those in the first exemplary embodiment.

Figure 22:
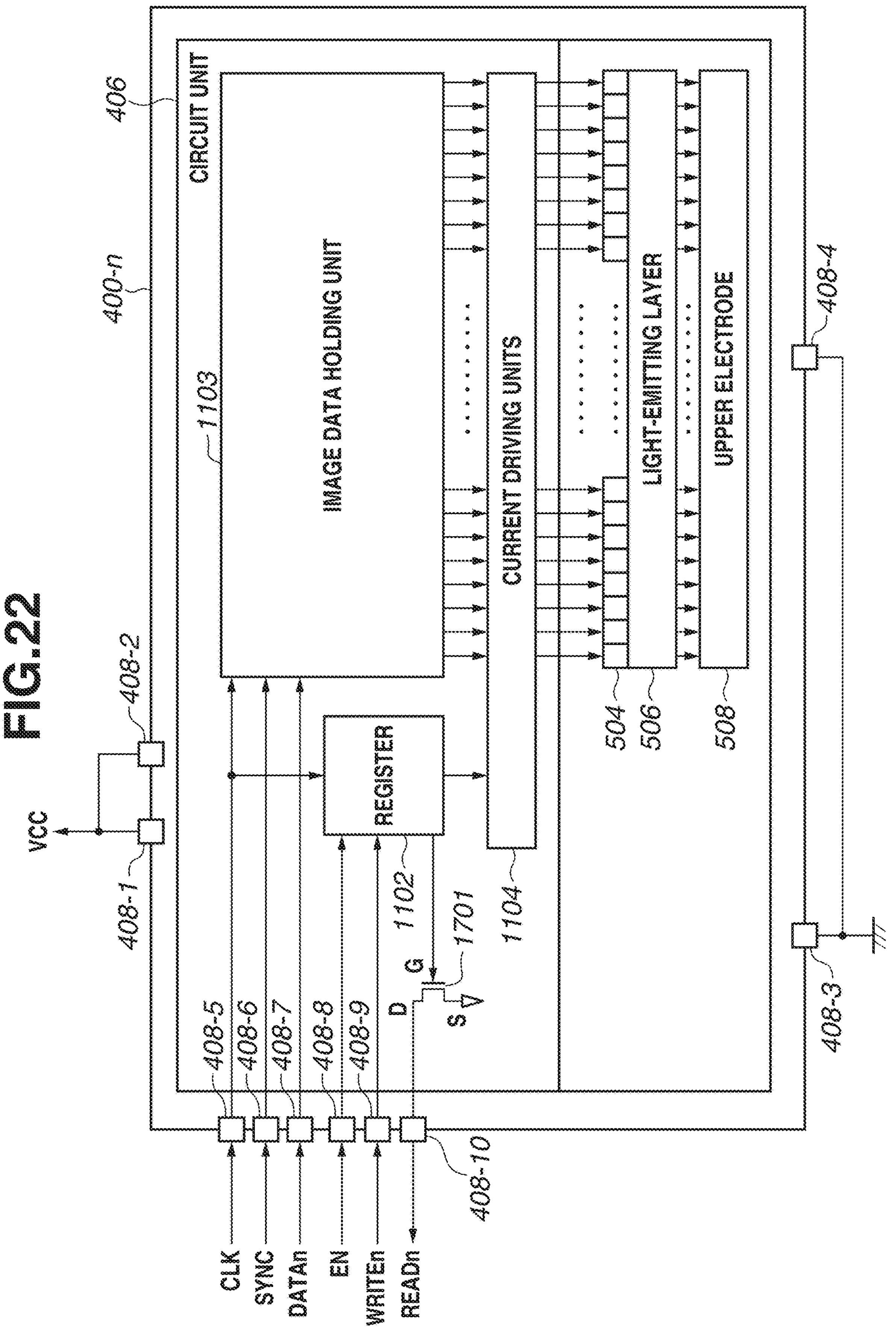
FIG. 22 is a functional block diagram of the light-emitting chip.

FIG. 22 is a functional block diagram of the light-emitting chip 400-*n* according to the present exemplary embodiment. Compared to the light-emitting chip 400-*n* according to the first exemplary embodiment, the light-emitting chip 400-*n* according to the present exemplary embodiment includes a field-effect transistor (FET) 1701. The pad 408-10 is connected to the in-substrate signal line READ and also connected to the drain terminal of the FET 1701. The source terminal of the FET 1701 is connected to a second potential lower than the first potential to which the pull-up resistor 1506 is connected, i.e., the ground in this example. Then, the gate terminal of the FET 1701 is connected to a terminal of the register 1102 that transmits control data. The FET 1701 serves as a switching unit that is switched to an on state or an off state based on the level of a signal from the register 1102. In the on state, the in-substrate signal line READ is connected to the second potential. In the off state, the connection of the in-substrate signal line READ to the second potential is disconnected, and the in-substrate signal line READ enters a high-impedance state. While the register 1102 does not transmit control data to the image controller 700, the register 1102 switches the FET 1701 to the off state. As described above, the in-substrate signal line READ is configured as an open drain output with the FET 1701 and the pull-up resistor 1506. On the other hand, while the register 1102 transmits control data to the image controller 700, the register 1102 switches the FET 1701 to the on state or the off state according to the data value. In the case of the on state, a signal at a low level that is based on the second potential is output to the signal line READ. On the other hand, in the case of the off state, a signal at a high level that is based on the first potential is output to the signal line READ by the pull-up resistor 1506 of the printed circuit board 202.

As described above, the in-substrate signal line READ is configured as an open drain output, whereby, while control data is read from the register 1102 in a certain light-emitting chip 400, the pads 408-10 of the other light-emitting chips 400 enter the high-impedance states. Thus, the potentials from the other light-emitting chips 400 to the in-substrate signal lines READ do not influence the signal line READ, and the single signal line READ can be shared.

In the present exemplary embodiment, processing performed in a case where a printing request is received from the user is similar to that in the first exemplary embodiment illustrated in FIG. 17. The reading of pieces of control data from the light-emitting chips 400-1 to 400-20 in step S11, however, cannot be performed in parallel, and is sequentially performed. The same applies to the processing for forming the test pattern in FIG. 19.

In the present exemplary embodiment, it therefore takes more time to read pieces of control data from the light-emitting chips 400 than in the first exemplary embodiment. It is, meanwhile, possible to shorten the time of transmission of pieces of control data to the light-emitting chips 400. In the present exemplary embodiment, it is also possible to decrease the number of signal lines READ as compared to the first exemplary embodiment and, as a result, it is possible to reduce the cost.

A third exemplary embodiment will be described mainly based on the differences from the first and second exemplary embodiments. In the first and second exemplary embodiments, the image controller 700 transmits image data to the light-emitting chip 400-*n* using the signal line DATAn and transmits control data to the light-emitting chip 400-*n* using the signal line WRITEn. When the image controller 700 transmits the image data to the light-emitting chip 400-*n*, the image controller 700 transmits a line synchronization signal to the signal line SYNC. When the image controller 700 accesses the register 1102 in the light-emitting chip 400-*n*, the image controller 700 transmits an enable signal to the signal line EN. In the present exemplary embodiment, the image controller 700 transmits image data and control data to the light-emitting chip 400-*n* using the signal line DATAn and transmits a line synchronization signal and an enable signal using the signal line SYNC. That is, in the present exemplary embodiment, the signal lines WRITEn and EN are not used. Thus, while a total of ten pads 408-1 to 408-10 are provided in each light-emitting chip 400 as illustrated in FIG. 5 in the first and second exemplary embodiments, a total of eight pads 408-1 to 408-8 are provided in each light-emitting chip 400 in the present exemplary embodiment.

Figure 23:
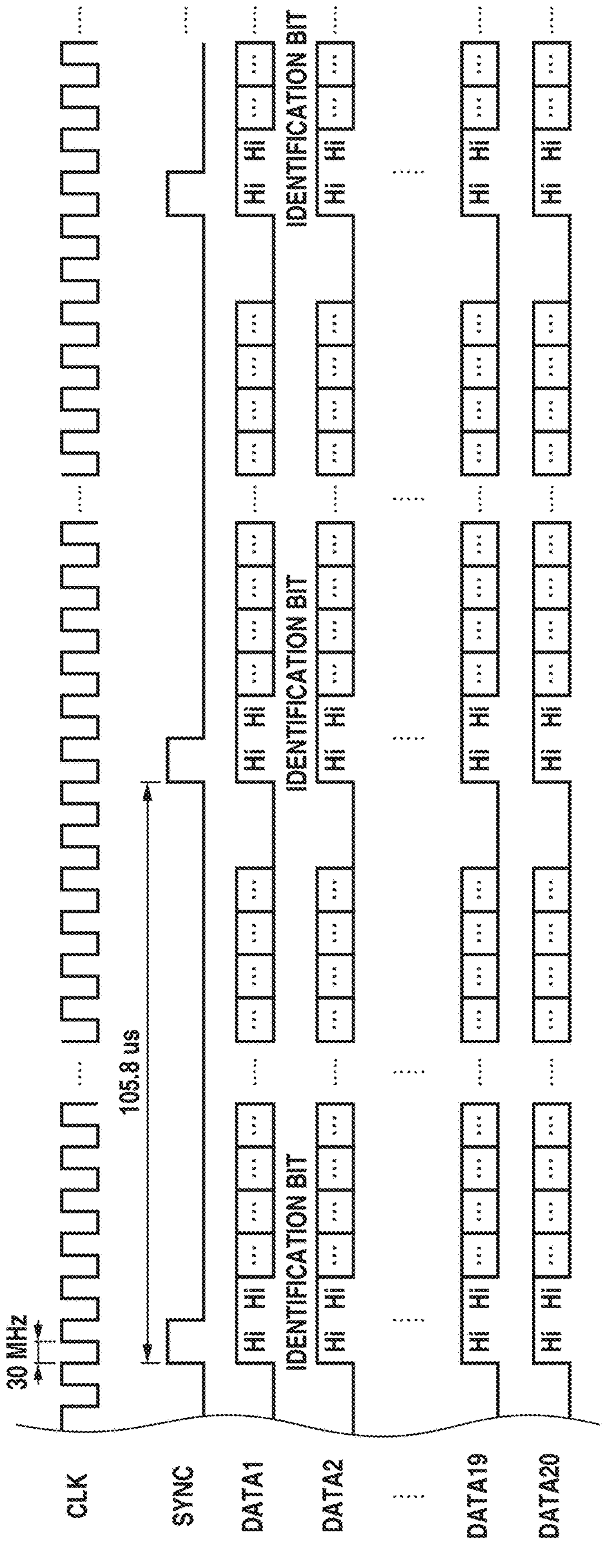
FIG. 23 is a diagram illustrating examples of signals of signal lines when image data is transmitted.
Figure 24A:
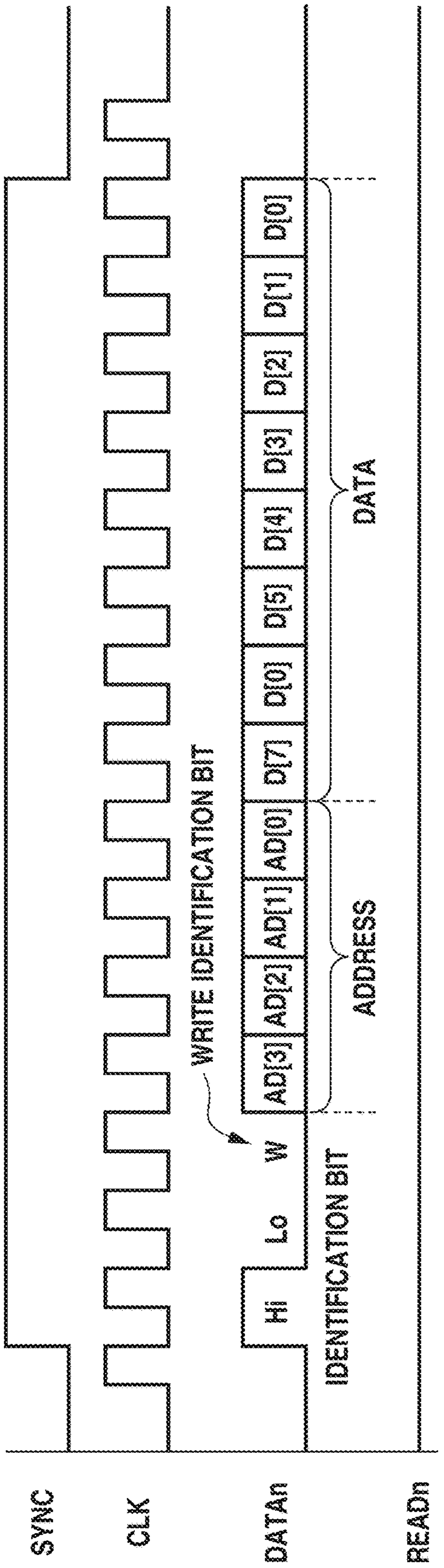
FIGS. 24A and 24B are diagrams illustrating examples of signals of signal lines when an image controller accesses a register.
Figure 24B:
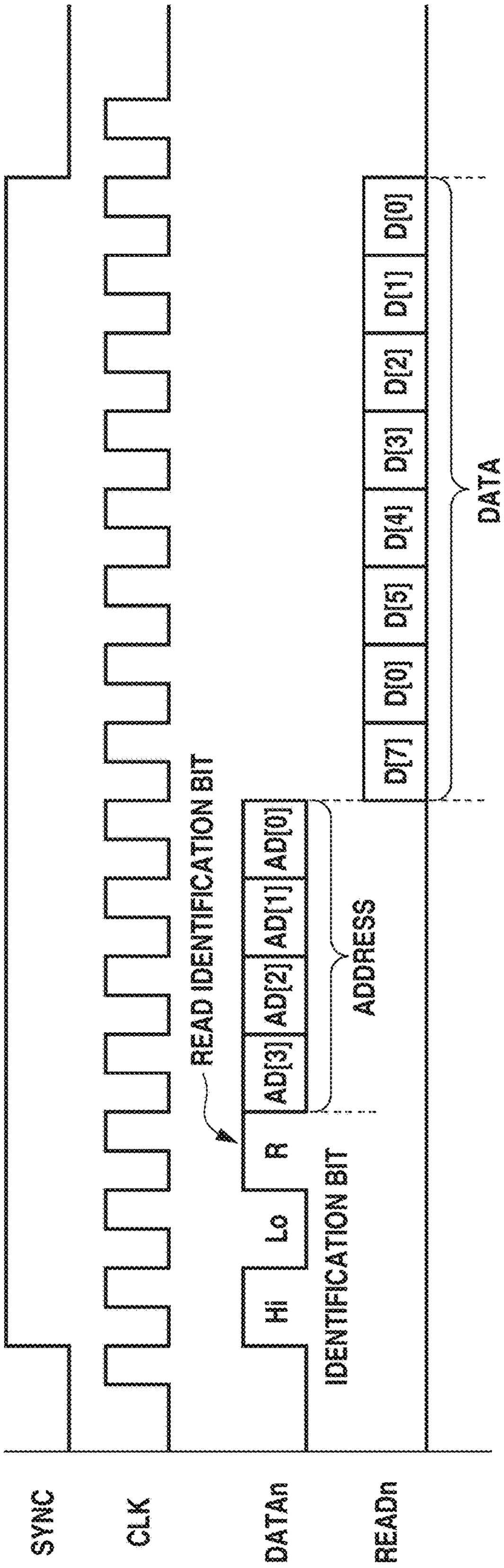
Figure 25:
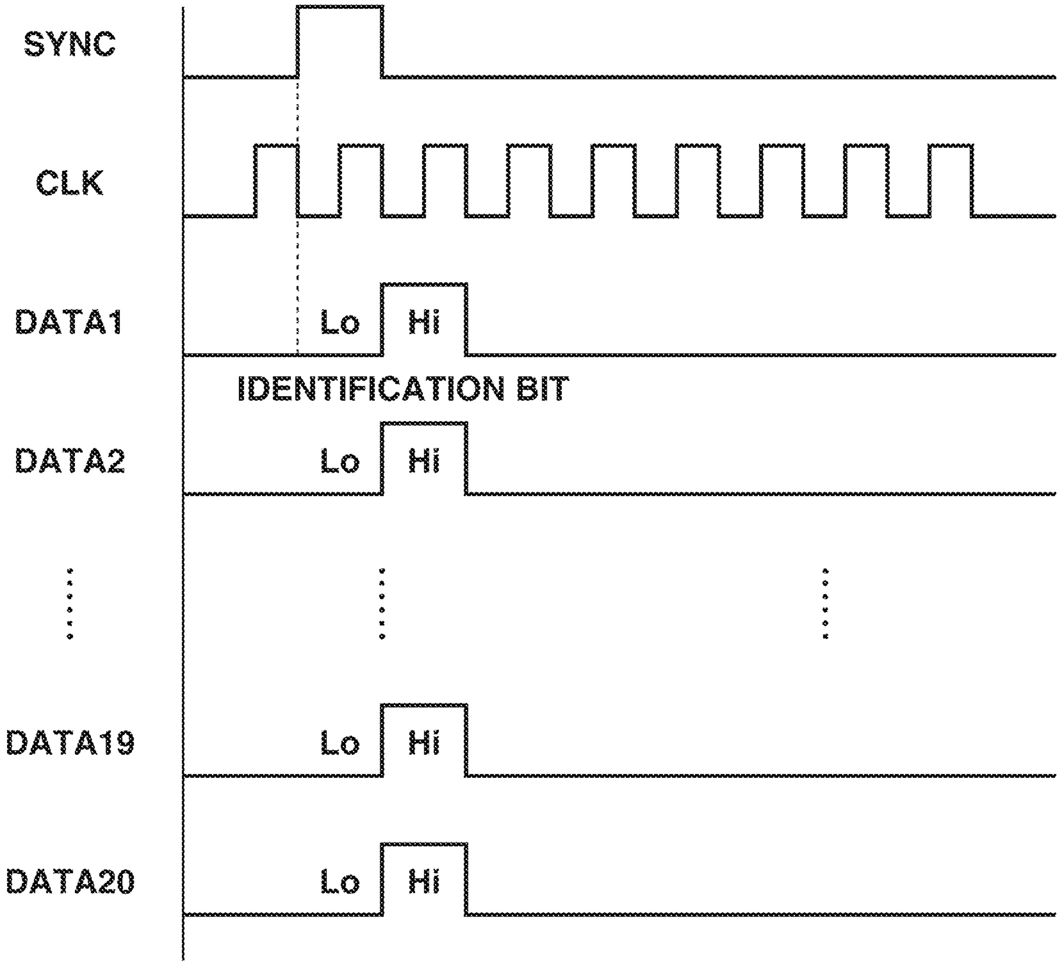
FIG. 25 is a diagram illustrating examples of signals of signal lines when an identification bit indicating a type "disabled" is transmitted.

FIGS. 23 to 25 illustrate signals of signal lines in a case where the data switching unit 705 outputs pieces of data of various types to each light-emitting chip 400. In FIGS. 23 to 25, if the level of a signal is high ("Hi" in the drawings), the bit value is "1". If the level of a signal is low ("Lo" in the drawings), the bit value is "0".

FIG. 23 illustrates a case where the data type is "image". If the data type is "image", a line synchronization signal indicating the exposure timing of a single line in the photosensitive member 102 is output to the signal line SYNC. In this example, the circumferential speed of the photosensitive member 102 is 200 mm/s, and the resolution in the sub-scanning direction is 1200 dpi (about 21.16 μm). Thus, the line synchronization signal is output in a cycle of about 105.8 μs, which is the period when the surface of the photosensitive member 102 moves by about 21.16 μm. The data switching unit 705 transmits an identification bit having a value "11" indicating that the data type is "image" to the signal line DATAn in synchronization with the rising edge of the line synchronization signal. Then, the data switching unit 705 transmits image data. In the present exemplary embodiment, since each light-emitting chip 400 includes 2992 light-emitting points 602, the data switching unit 705 needs to transmit image data indicating whether or not each of a total of 2992 light-emitting points 602 emits light within a period of about 105.8 μs. To transmit image data for a total of 2992 light-emitting points 602 within a period of about 105.8 μs, in this example, as illustrated in FIG. 23, the data switching unit 705 sets the frequency of a clock signal to be transmitted to the signal line CLK to 30 MHz when transmitting the image data.

FIGS. 24A and 24B illustrate a case where the data type is "control". FIG. 24A illustrates a case where control data is written to the register 1102 in each light-emitting chip 400. FIG. 24B illustrates a case where control data stored in the register 1102 in each light-emitting chip 400 is read. If the data type is "control", an enable signal that switches to a high level and indicates that communication is being performed is output to the signal line SYNC during communication. The data switching unit 705 transmits an identification bit having a value "10" indicating that the data type is "control" to the signal line DATAn in synchronization with the rising edge of the enable signal. In a case where control data is written, the data switching unit 705 transmits a write identification bit indicating a writing operation after the identification bit. Then, the data switching unit 705 transmits the address (4 bits in this example) of the register to which the control data is to be written and the control data (8 bits in this example). The order of the transmission of the address and the control data may be reversed. In a case where control data is read, the data switching unit 705 transmits a read identification bit indicating a reading operation after the identification bit. Then, the data switching unit 705 transmits the address of the register from which the control data is to be read. In this case, the light-emitting chip 400-*n* reads the control data stored at the specified address from the register 1102 and outputs the control data to the signal line READn. The amount of control data is smaller than the amount of image data, and therefore, the frequency of a clock signal to be output to the signal line CLK can be made lower than that when image data is transmitted. As an example, the frequency of a clock signal when control data is read or written can be 3 MHz. However, a configuration may be employed in which the frequency of a clock signal when control data is read or written is the same as that when image data is transmitted.

FIG. 25 illustrates a case where the data type is "disabled". If the data type is "disabled", a trigger signal indicating the transmission of an identification bit is output to the signal line SYNC. The data switching unit 705 transmits an identification bit having a value "Ox" indicating that the data type is "disabled" to the signal line DATAn in synchronization with the rising edge of the trigger signal. In a case where the data type "disabled" is transmitted, the data switching unit 705 can make the frequency of a clock signal to be output to the signal line CLK the same as that when image data is transmitted. Or in a case where the data type "disabled" is transmitted, the data switching unit 705 can make the frequency of the clock signal to be output to the signal line CLK the same as that when the image controller 700 accesses the register 1102. Further, in a case where the data type "disabled" is transmitted, the data switching unit

705 can make the frequency of the clock signal to be output to the signal line CLK the same as the frequency before the data type "disabled" is transmitted. Furthermore, in a case where the data type "disabled" is transmitted, the data switching unit 705 can set the frequency of the clock signal to be output to the signal line CLK to a predetermined value different from those when the image data is transmitted and when the image controller 700 accesses the register 1102.

Figure 26:
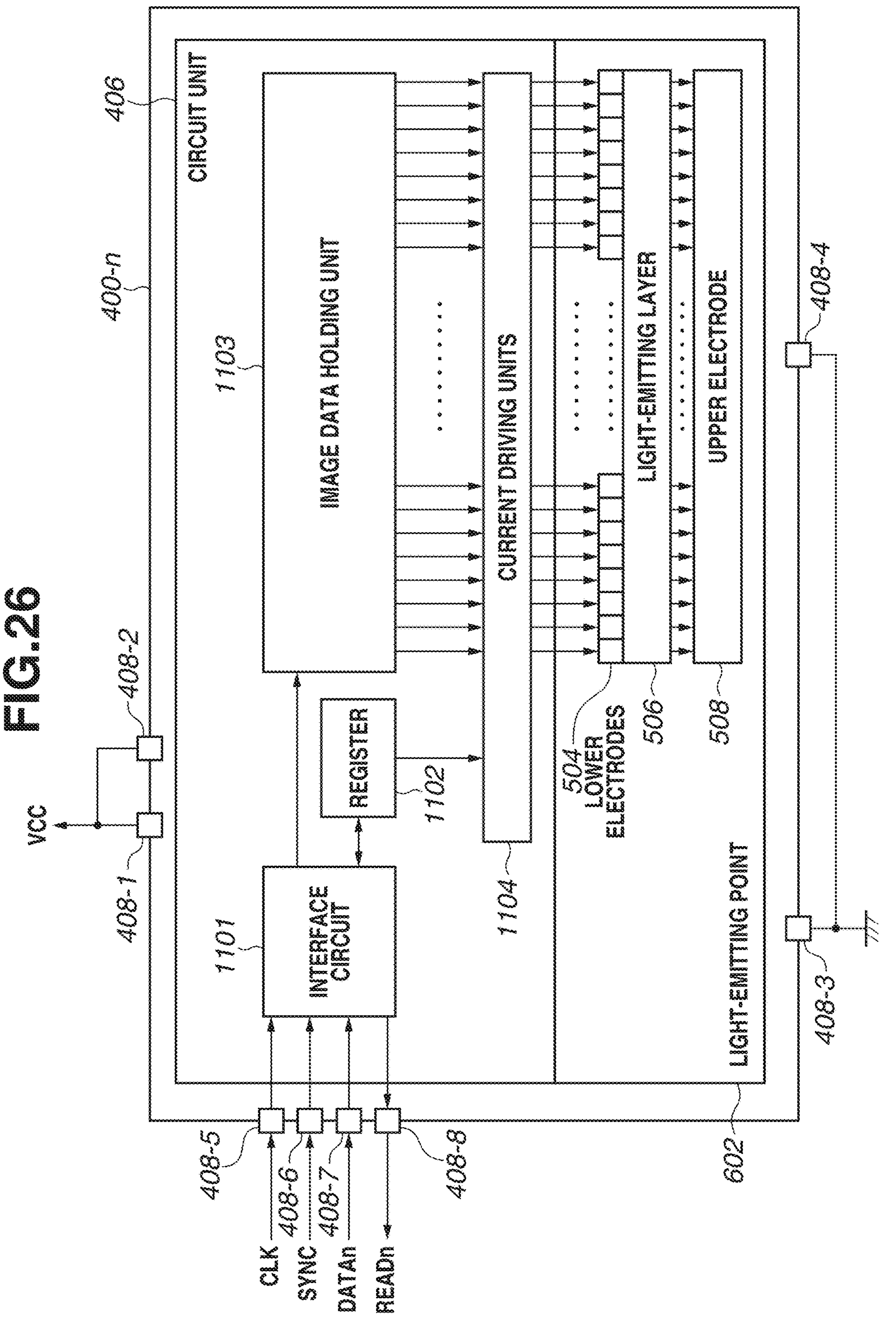
FIG. 26 is a functional block diagram of a light-emitting chip.

FIG. 26 is a functional block diagram of the light-emitting chip 400-*n* according to the present exemplary embodiment. In the present exemplary embodiment, an interface circuit 1101 is provided in the circuit unit 406. The interface circuit 1101 is connected to the signal lines CLK, SYNC, DATAn, and READn via the pads 408-5 to 408-8.

Figure 27:
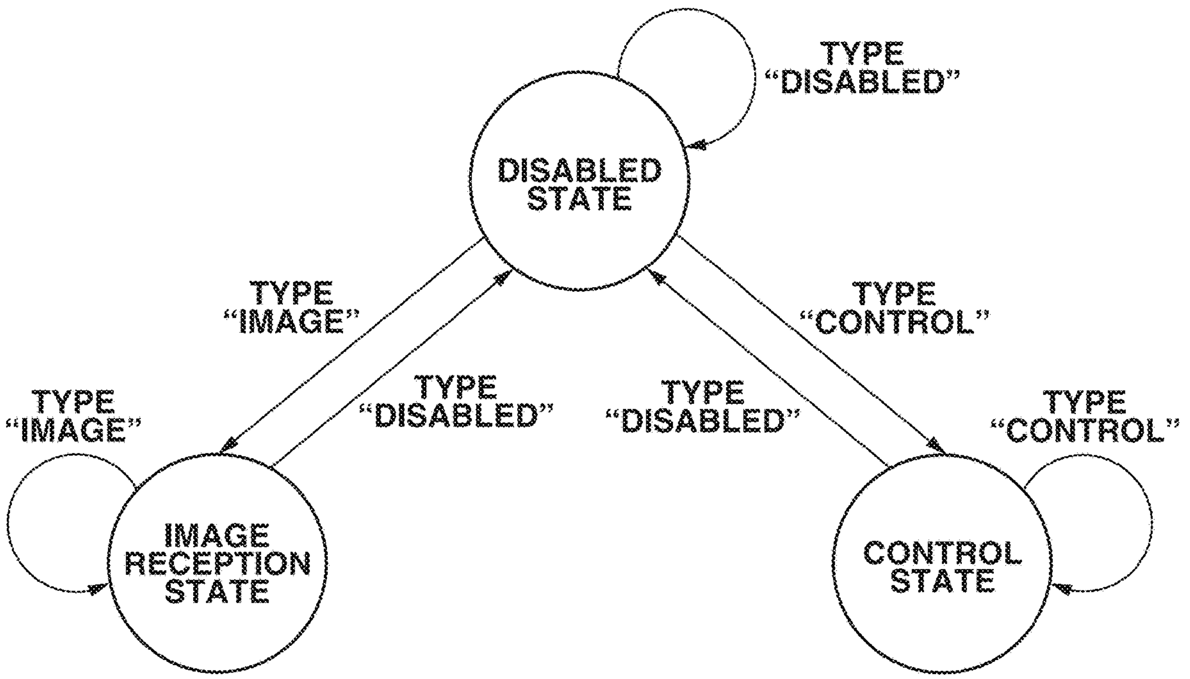
FIG. 27 is a state transition diagram of an interface circuit.

Based on an identification bit received using the signal line DATAn in synchronization with the rising edge of a signal received using the signal line SYNC, the interface circuit 1101 manages the state of the interface circuit 1101. FIG. 27 is a state transition diagram of the interface circuit 1101. The initial state when power is supplied based on the power supply voltage VCC is a disabled state. In the disabled state, if an identification bit indicating the type "disabled" is received, the interface circuit 1101 remains in the disabled state. In the disabled state, the interface circuit 1101 only receives an identification bit, and does not transmit data to another circuit.

In the disabled state, if an identification bit indicating the type "image" is received, the interface circuit 1101 transitions to an image reception state. In this case, the interface circuit 1101 transmits image data received using the signal line DATAn after the identification bit to the image data holding unit 1103. At this time, the interface circuit 1101 also transmits a clock signal received using the signal line CLK and a line synchronization signal received using the signal line SYNC to the image data holding unit 1103. In the image reception state, if an identification bit indicating the type "image" is received, the state of the interface circuit 1101 does not transition, and the interface circuit 1101 transmits image data received using the signal line DATAn after the identification bit to the image data holding unit 1103. On the other hand, in the image reception state, if an identification bit indicating the type "disabled" is received, the interface circuit 1101 transitions to the disabled state.

In the disabled state, if an identification bit indicating the type "control" is received, the interface circuit 1101 transitions to a control state. In this case, the interface circuit 1101 writes control data to the register 1102 or reads control data stored in the register 1102, based on data received using the signal line DATAn after the identification bit. At this time, the interface circuit 1101 transmits a clock signal received using the signal line CLK and an enable signal received using the signal line SYNC to the register 1102. In the control state, if an identification bit indicating the type "control" is received, the state of the interface circuit 1101 does not transition, and the interface circuit 1101 writes control data to the register 1102 or reads control data from the register 1102, based on data received using the signal line DATAn after the identification bit. On the other hand, in the control state, if an identification bit indicating the type "disabled" is received, the interface circuit 1101 transitions to the disabled state.

On the other hand, in the image reception state, if an identification bit indicating the type "control" is received, the interface circuit 1101 remains in the image reception state, and does not transition to another state. In this case, the interface circuit 1101 determines that data received using the signal line DATAn until a next identification bit is received is neither image data nor control data. Then, the interface circuit 1101 discards the received data, and does not output the received data to another circuit. Similarly, in the control state, if an identification bit indicating the type "image" is received, the interface circuit 1101 remains in the control state, and does not transition to another state. In this case, the interface circuit 1101 determines that data received using the signal line DATAn until a next identification bit is received is neither image data nor control data. Then, the interface circuit 1101 discards the received data, and does not output the received data to another circuit.

As described above, in the present exemplary embodiment, direct transition from the image reception state to the control state and direct transition from the control state to the image reception state are prohibited. This is to prevent the interface circuit 1101 from malfunctioning due to an error occurring in an identification bit received by the interface circuit 1101 because of noise or static electricity from outside. That is, in the present exemplary embodiment, the transition between the "image reception state" and the "control state" is performed via the "disabled state", and the data type "disabled" is provided to cause the interface circuit 1101 to transition to the "disabled state".

If the image data holding unit 1103 receives image data for a single line based on a line synchronization signal, the image data holding unit 1103 generates driving signals for controlling the light emission of the light-emitting points 602 based on the image data and outputs the driving signals to the current driving units 1104.

As described above, also in the present exemplary embodiment, pieces of control data are transmitted to the light-emitting chips 400 in parallel using the dedicated signal lines DATA1 to DATA20 respectively corresponding to the light-emitting chips 400-1 to 400-20. Thus, it is possible to shorten the time of transmission of pieces of control data to the light-emitting chips 400. Further, in the present exemplary embodiment, the signal lines DATA1 to DATA20 are shared for the transmission of pieces of image data and the transmission of pieces of control data. Thus, it is possible to decrease the number of signal lines compared to the first exemplary embodiment and, as a result, it is possible to reduce the cost.

To notify each light-emitting chip 400 of whether data to be transmitted to the shared signal line, i.e., the signal line DATA, is control data or image data, identification information indicating the data type is transmitted using the signal line DATA before the transmission of the data. As a result, the interface circuit 1101 can determine whether the data transmitted from the image controller 700 is control data or image data. That is, it is possible to decrease the number of signal lines for connecting the image controller 700 and the printed circuit board 202 and also control the turning on and off of the light-emitting points 602 and adjust the amount of current supplied to the light-emitting points 602 (a voltage that is to be applied to the electrodes 504 and 508). That is, it is possible to prevent an increase in the cost of the image forming apparatus and also control the light emission of the light-emitting points 602.

In the present exemplary embodiment, when the image controller 700 switches the data types "control" and "image", the image controller 700 first transmits the data type "disabled" and then switches to the other data type. With this configuration, it is possible to prevent the image forming apparatus from malfunctioning by incorrectly detecting the data type due to disturbance such as noise or static electricity.

In the present exemplary embodiment, the "image reception state" and the "control state" of the interface circuit 1101 transition to each other via the "disabled state" as described above. Thus, after image data is transmitted or after access to the register 1102 is completed, the data switching unit 705 transmits an identification bit indicating the type "disabled". However, a configuration may be employed in which direct transition between the "image reception state" and the "control state" is allowed without providing the "disabled state". In this case, the data switching unit 705 only transmits an identification bit indicating the type "image" before image data is transmitted, or transmits an identification bit indicating the type "control" before the image controller 700 accesses the register 1102. Even with such a configuration, it is possible to decrease the number of signal lines for connecting the image controller 700 and the printed circuit board 202.

In FIG. 26, similarly to the first exemplary embodiment, the dedicated signal lines READ1 to READ20 are provided for the light-emitting chips 400-1 to 400-20, respectively. However, similarly to the second exemplary embodiment, a configuration can also be employed in which a single signal line READ common to the light-emitting chips 400 is provided.

Although specific numerical values have been used for illustrative purposes in the above exemplary embodiments, these specific numerical values are merely illustrative, and the present disclosure is not limited to the specific numerical values used in the exemplary embodiments. Specifically, the number of light-emitting chips 400 provided in a single printed circuit board 202 is not limited to 20, and can be any number greater than or equal to one. The number of light-emitting points 602 included in each light-emitting chip 400 is not limited to 2992, either, and may be any other number. Although a single light-emitting chip 400 includes four sets of 748 light-emitting points placed along the main scanning direction in the above-described exemplary embodiments, the number of sets can be any number greater than or equal to one. Although light-emitting points 602 are placed at a pitch of about 21.16 μm, which corresponds to a resolution of 1200 dpi in the main scanning direction, the placement interval between light-emitting points 602 may also have any other value.

In the above exemplary embodiments, the image forming apparatus transfers toner images formed on the photosensitive members 102 to a sheet conveyed on the transfer belt 111. The image forming apparatus, however, may transfer toner images on the photosensitive members 102 to a sheet via an intermediate transfer member. The image forming apparatus may be a color image forming apparatus that forms an image using toners of a plurality of colors, or may be a monochrome image forming apparatus that forms an image using a toner of a single color.

Next, a fourth exemplary embodiment will be described mainly based on the differences from the first to third exemplary embodiments. When the image forming apparatus according to each of the first to third exemplary embodiments performs the gradation correction control, the image forming apparatus forms the test pattern for the gradation correction control on the sheet. Then, the user causes the reading unit 100 to read the sheet on which the test pattern is formed. The image forming apparatus detects the density of each of the test images PT1 to PT5 included in the test pattern and corrects the image forming condition regarding the density such that the density of each of the test images PT1 to PT5 comes close to the target density. Specifically, for example, the image controller 700 rewrites pieces of control data such that the density of each of the test images PT1 to PT5 comes close to the target density.

Figure 28:
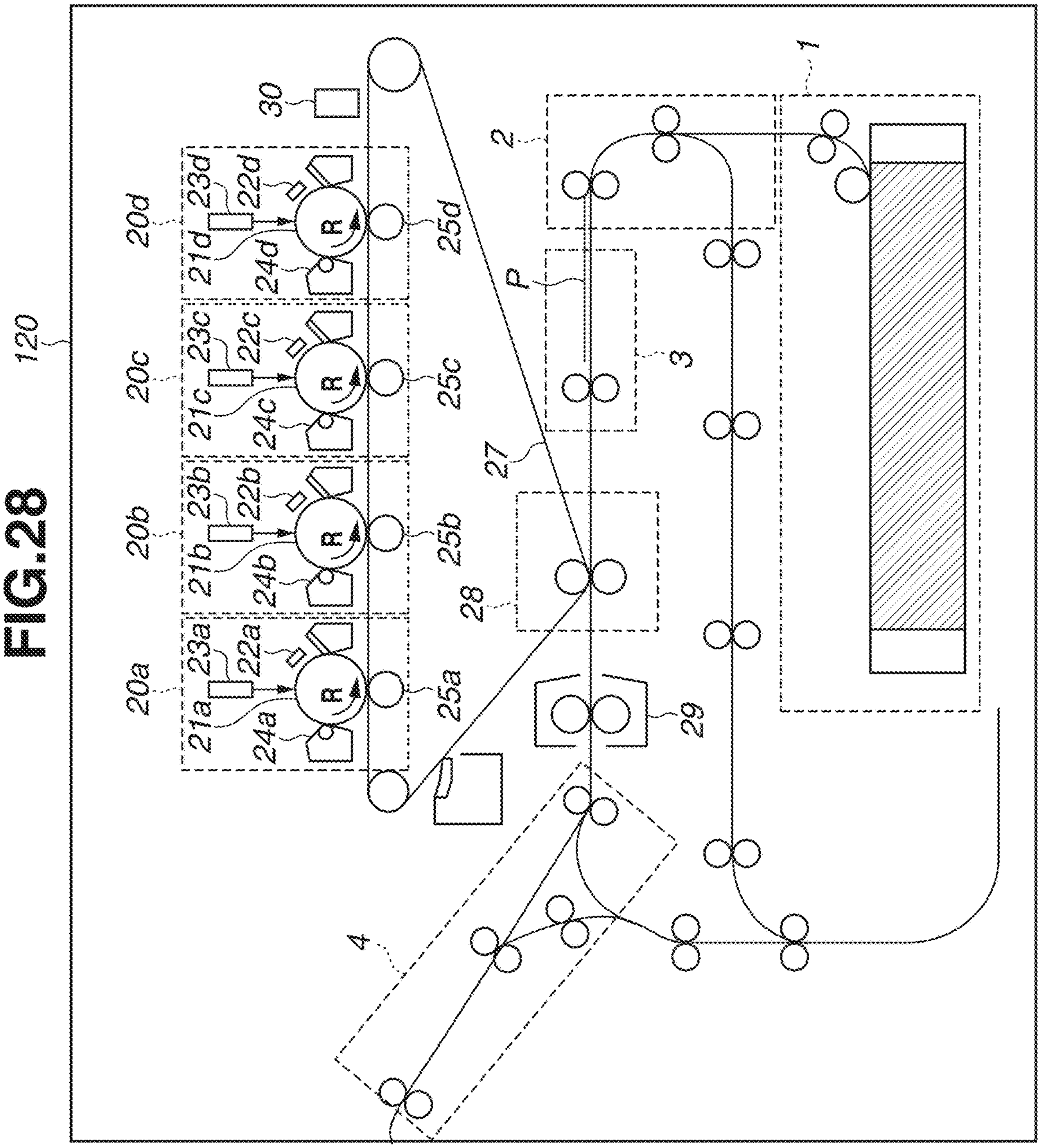
FIG. 28 is a schematic diagram illustrating a configuration of an image forming apparatus

FIG. 28 is a diagram illustrating an image forming apparatus 120 according to the present exemplary embodiment. The image forming apparatus 120 according to the present exemplary embodiment may be applied to each of the first to third exemplary embodiments.

Image forming units 20*a*, 20*b*, 20*c*, and 20*d* form yellow (Y), magenta (M), cyan (C), and black (K) toner images, respectively. In the following description, a plurality of components similar to or the same as each other is designated by the same reference numerals. When the plurality of components is distinguished from each other, alphabetical letters are added to the end of the reference sign. When an item common to the plurality of components is described, the alphabetical letters at the end of the reference numeral are omitted. An exposure head 23 in the following description has a configuration similar to that of the exposure head 106 described in each of the first to third exemplary embodiments.

A photosensitive member 21 is an image bearing member that bears an electrostatic latent image and a toner image. A charging device 22 charges the surface of the photosensitive member 21. The exposure head 23 exposes the photosensitive member 21, thereby forming an electrostatic latent image. A developing device 24 develops the electrostatic latent image using toner, thereby forming a toner image. A primary transfer roller 25 transfers the toner image from the photosensitive member 21 to an intermediate transfer belt 27. The intermediate transfer belt 27 conveys the toner image to a secondary transfer device 28.

A feeding device 1 feeds a sheet P held in sheet storage to a conveying path. A conveying device 2 conveys the sheet P to a registration device 3. The registration device 3 corrects the skew of the sheet P and conveys the sheet P to the secondary transfer device 28.

The secondary transfer device 28 transfers the toner image from the intermediate transfer belt 27 to the sheet P. A fixing device 29 applies heat and pressure to the sheet P, thereby fixing the toner image onto the sheet P. A discharge/conveying device 4 conveys and discharges the sheet P onto which the toner image is fixed to outside the image forming apparatus 120.

In the present exemplary embodiment, a current that is based on the values of pieces of control data set based on a test pattern is supplied to light-emitting units, and as a result, the photosensitive member 21 is exposed. During an image forming job for forming images on a plurality of sheets, if the number of sheets on which images are formed reaches a predetermined number, the image forming apparatus 120 forms a plurality of patch images for the gradation correction control on the intermediate transfer belt 27. For example, the densities of the plurality of patch images correspond to the densities of the test images PT1 to PT5 according to the first exemplary embodiment.

The image controller 700 causes a sensor 30 provided adjacent to the intermediate transfer belt 27 to read the patch images formed on the intermediate transfer belt 27 and detects the density of each of the patch images. For example, the image controller 700 rewrites the pieces of control data such that the density of each of the patch images comes close to a target density. The target density corresponds to the target density when the pieces of control data are set based on the test pattern (FIG. 18). To the writing of the pieces of control data, the configuration of any of the first to third exemplary embodiments is applied.

Alternatively, if the number of sheets on which images are formed reaches the predetermined number, the image forming apparatus 120 may stop the conveyance of a sheet (the image forming job) once and form a plurality of patch images having densities corresponding to the test images PT1 to PT5 on the intermediate transfer belt 27. The image controller 700 may cause the sensor 30 to read the plurality of patch images. Then, the image controller 700 may rewrite the pieces of control data based on the reading result. If the rewriting of the pieces of control data is completed, the image forming apparatus 120 may resume the image forming job.

In the image forming job, during the period from when an electrostatic latent image of a first page is formed on the photosensitive member 21 to when an electrostatic latent image of a second page after the first page is formed on the photosensitive member 21, the image forming apparatus 120 may form an electrostatic latent image corresponding to a patch image having a density corresponding to the test image PT1 on the photosensitive member 21 (i.e., form the patch image on the intermediate transfer belt 27). Then, during the period from when the electrostatic latent image of the second page is formed on the photosensitive member 21 to when an electrostatic latent image of a third page after the second page is formed on the photosensitive member 21, the image forming apparatus 120 may form an electrostatic latent image corresponding to a patch image having a density corresponding to the test image PT2 on the photosensitive member 21 (i.e., form the patch image on the intermediate transfer belt 27). As described above, during the period from when an electrostatic latent image for a single page is formed on the photosensitive member 21 to when a latent image for a next page after the page is formed on the photosensitive member 21, the image forming apparatus 120 may form an electrostatic latent image corresponding to a patch image on the photosensitive member 21 (i.e., form the patch image on the intermediate transfer belt 27). Every time a patch image is formed, the image controller 700 may cause the sensor 30 to read the patch image. If the reading results of the test images PT1 to PT5 are obtained, the image controller 700 may rewrite pieces of control data based on the reading results.

As described above, the image controller 700 and each of the plurality of light-emitting chips 400 are individually connected to each other via the dedicated signal line WRITEn and the dedicated signal line READn so that the image controller 700 can access the registers 1102 in the plurality of light-emitting chips 400 in parallel. With this configuration, it is possible to shorten the time of transmission of pieces of control data to the light-emitting chips 400 compared to a case where the image controller 700 sequentially accesses the light-emitting chips 400 using a single signal line WRITE and a single signal line READ. Such a configuration is particularly effective in a case where it is necessary to form patch images (rewrite pieces of control data) in a relatively short period, e.g., a case where, during the period from when an electrostatic latent image for a single page is formed on the photosensitive member 21 to when an electrostatic latent image for a next page after the page is formed on the photosensitive member 21, an electrostatic latent image corresponding to a patch image is formed on the photosensitive member 21 (i.e., the patch image is formed on the intermediate transfer belt 27). In the gradation correction control described in the present exemplary embodiment, the densities of the plurality of patch images on the intermediate transfer belt 27 are detected, instead of detecting the densities of the plurality of test images PT1 to PT5 on the sheet P described in the first exemplary embodiment. Thus, the plurality of patch images according to the present exemplary embodiment can be regarded as the plurality of test images according to the first exemplary embodiment.

Figure 29:
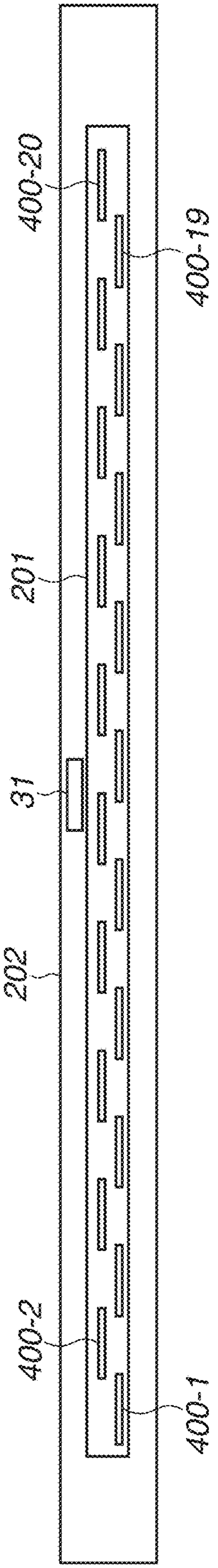
FIG. 29 is a diagram illustrating a printed circuit board of an exposure head

Next, a fifth exemplary embodiment will be described mainly based on the differences from the first to fourth exemplary embodiments. In the present exemplary embodiment, as illustrated in FIG. 29, a temperature sensor 31 for detecting the temperature of the printed circuit board 202 (the temperature of the light-emitting chips 400 or the temperature of the light-emitting points or light-emitting units 602) is provided on the surface of the printed circuit board 202 on which the light-emitting point group 201 is mounted. The temperature sensor 31 may be provided on the surface on the opposite side of the surface of the printed circuit board 202 on which the light-emitting point group 201 is mounted (FIG. 3A).

Figure 30:
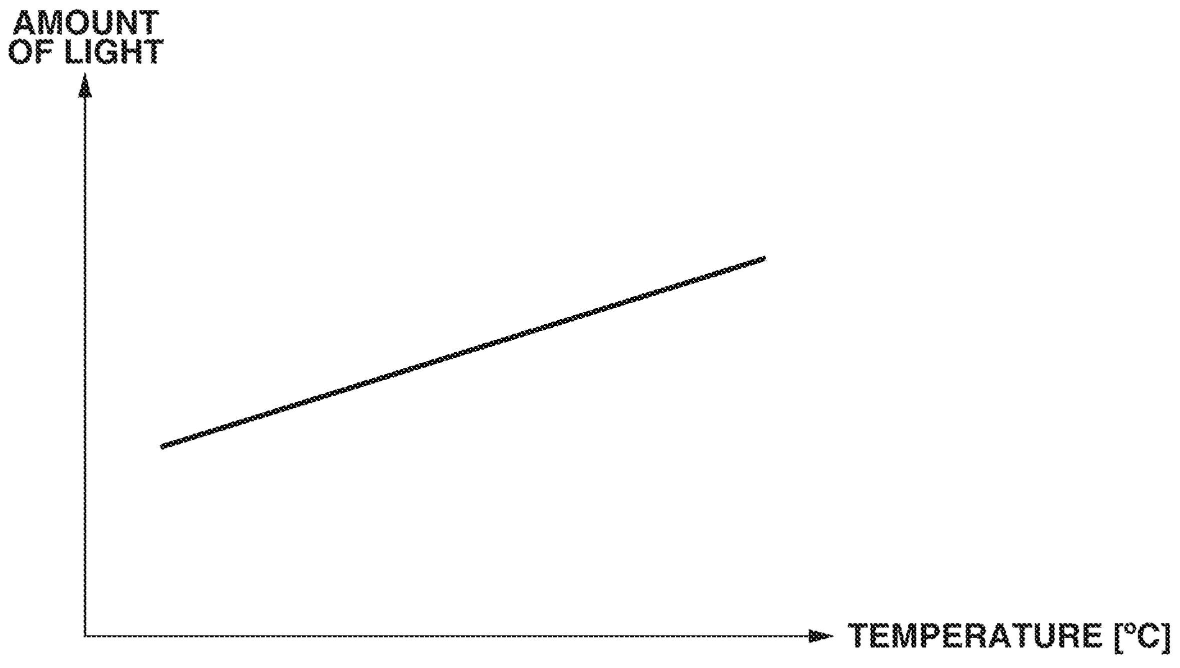
FIG. 30 is a diagram illustrating a relationship between a temperature of a light-emitting unit and an amount of light when a predetermined current is supplied to the light-emitting unit.

FIG. 30 is a diagram illustrating the relationship between the temperature of a light-emitting unit 602 and the amount of light when a predetermined current is supplied to the light-emitting unit 602. The relationship illustrated in FIG. 30 is merely an example, and the relationship between the temperature and the amount of light is not necessarily linearly represented.

As illustrated in FIG. 30, the higher the temperature is, the greater the amount of light emitted from the light-emitting unit 602 to which the predetermined current is supplied is. In the present exemplary embodiment, for example, the relationship between the temperature and the amount of light for each chip illustrated in FIG. 30 is stored in a memory provided in the image controller 700. Based on the detection result of the temperature sensor 31 and the relationship between the temperature and the amount of light stored in the memory, the image controller 700 rewrites pieces of control data stored in the registers 1102, for example, such that if the temperature increases, a current supplied to the light-emitting units 602 decreases.

For example, in an image forming job for forming images on a plurality of sheets, the pieces of control data are rewritten during the period from when an image for a single page is formed on the intermediate transfer belt 27 to when an image for a next page after the page is formed on the intermediate transfer belt 27.

As described above, the image controller 700 and each of the plurality of light-emitting chips 400 are individually connected to each other via the dedicated signal line WRITEn and the dedicated signal line READn so that the image controller 700 can access the registers 1102 in the plurality of light-emitting chips 400 in parallel. With this configuration, it is possible to shorten the time of transmission of pieces of control data to the light-emitting chips 400 compared to a case where the image controller 700 sequentially accesses the light-emitting chips 400 using a single signal line WRITE and a single signal line READ. Such a configuration is particularly effective in a case where it is necessary to rewrite pieces of control data during the period from when an electrostatic latent image for a single page is formed on the photosensitive member 21 to when an electrostatic latent image for a next page after the page is formed on the photosensitive member 21.

Although specific numerical values have been used for illustrative purposes in the above exemplary embodiments, these specific numerical values are merely illustrative, and the present disclosure is not limited to the specific numerical values used in the exemplary embodiments. Specifically, the number of light-emitting chips 400 provided in a single printed circuit board 202 is not limited to 20, and can be any number greater than or equal to one. The number of light-emitting points 602 included in each light-emitting chip 400 is not limited to 2992, either, and may be any other number. Although a single light-emitting chip 400 includes four sets of 748 light-emitting points placed along the main scanning direction in the present exemplary embodiments, the number of sets can be any number greater than or equal to one. Although light-emitting points 602 are placed at a pitch of about 21.16 μm, which corresponds to a resolution of 1200 dpi in the main scanning direction, the placement interval between light-emitting points 602 may also have any other value.

In the above exemplary embodiments, the image forming apparatus transfers toner images formed on the photosensitive members 102 to a sheet conveyed on the transfer belt 111. The image forming apparatus, however, may transfer toner images on the photosensitive members 102 to a sheet via an intermediate transfer member. The image forming apparatus may be a color image forming apparatus that forms an image using toners of a plurality of colors, or may be a monochrome image forming apparatus that forms an image using a toner of a single color.

OTHER EXEMPLARY EMBODIMENTS

The present disclosure can also be realized by the processing in which a program for implementing one or more functions of the exemplary embodiments described above is supplied to a system or an apparatus via a network or a storage medium, and one or more processors in a computer of the system or the apparatus reads and executes the program. Further, the present disclosure can also be implemented by a circuit (for example, an application specific integrated circuits (ASIC)) capable of implementing the one or more functions.

The disclosure is not limited to the above exemplary embodiments, and can be changed and modified in various ways without departing from the spirit and the scope of the disclosure. Thus, the claims are appended to publicize the scope of the disclosure.

According to the present disclosure, it is possible to shorten the time of transmission of pieces of control data to light-emitting chips of an exposure device.

Embodiments of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described Embodiments and/or that includes one or more circuits (e.g., application specific integrated circuit (ASIC)) for performing the functions of one or more of the above-described Embodiments, and by a method performed by the computer of the system or apparatus by, for example, reading out and executing the computer executable instructions from the storage medium to perform the functions of one or more of the above-described Embodiments and/or controlling the one or more circuits to perform the functions of one or more of the above-described Embodiments. The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read-only memory (ROM), a storage of distributed computing systems, an optical disk (such as a compact disc (CD), digital versatile disc (DVD), or Blu-ray Disc™ (BD)), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Applications No. 2022-086486, filed May 27, 2022, No. 2022-117428, filed Jul. 22, 2022, No. 2022-132719, filed Aug. 23, 2022, and No. 2023-059527, filed Mar. 31, 2023, which are hereby incorporated by reference herein in their entirety.

What is claimed is:

1. An image forming apparatus comprising:

a photosensitive member configured to rotate;

a plurality of light-emitting chips in each of which are provided a plurality of light-emitting units configured to emit light for exposing the photosensitive member, a circuit unit configured to turn on and off the plurality of light-emitting units based on image data for controlling the turning on and off of the plurality of light-emitting units, and a storage unit configured to store control data indicating a target amount of light of the plurality of light-emitting units, wherein the plurality of light-emitting chips is arranged along a rotational axis direction of the photosensitive member; and a controller integrated circuit (IC) configured to output control data, wherein each of the plurality of light-emitting chips is connected to the controller IC by a different one of a plurality of signal lines, wherein, in a case where the output control data is transmitted from the controller IC to each of the plurality of light-emitting chips via the different one of the plurality of signal lines, the transmitted control data is stored in the storage unit, and wherein, in a case where the reception unit receives third identification information, the reception unit transitions to a third state, and in a case where the reception unit is in the third state, the output control data is not stored in the first storage unit, and the image data is not stored in the second storage unit.

2. The image forming apparatus according to claim 1, wherein each of the plurality of light-emitting chips includes a digital-to-analog (D/A) converter configured to convert the transmitted control data into an analog signal, and wherein the plurality of light-emitting units emits light with an amount of light based on the analog signal.

3. The image forming apparatus according to claim 1, further comprising:

a first substrate on which the plurality of light-emitting chips is provided; and a second substrate on which the controller IC is provided, wherein the plurality of signal lines connect the first and second substrates.

4. The image forming apparatus according to claim 1, wherein, based on reception of a trigger signal, the controller IC transmits the output control data to each of the plurality of light-emitting chips via the different one of the plurality of signal lines.

5. The image forming apparatus according to claim 1, wherein the controller IC is configured to read the stored control data from each storage unit provided in the plurality of light-emitting chips via the different one of the plurality of signal lines, and wherein, in a case where the read control data and the transmitted control data transmitted from the controller IC to each of the plurality of light-emitting chips via the different one of the plurality of signal lines match each other, the controller IC transmits the image data to each of the plurality of light-emitting chips via the different one of the plurality of signal lines.

6. The image forming apparatus according to claim 1, wherein the plurality of signal lines is a plurality of first signal lines, wherein each of the plurality of light-emitting chips is connected to the controller IC by a different one of a plurality of second signal lines, wherein the controller IC is configured to read the stored control data from each storage unit provided in the plurality of light-emitting chips via the different one of the plurality of second signal lines, and wherein, in a case where the read control data and the transmitted control data transmitted from the controller IC to each of the plurality of light-emitting chips via the different one of the plurality of first signal lines match each other, the controller IC transmits the image data to each of the plurality of light-emitting chips via the different one of the plurality of second signal lines.

7. The image forming apparatus according to claim 1, wherein the plurality of signal lines is a plurality of first signal lines, wherein the plurality of light-emitting chips includes a plurality of light-emitting chip groups including the plurality of light-emitting chips, wherein each of the plurality of light-emitting chip groups is connected to the controller IC by a different one of a plurality of second signal lines, and wherein the controller IC is configured to read the stored control data from each storage unit provided in the plurality of light-emitting chips via the different one of the plurality of second signal lines, and wherein, in a case where the read control data and the transmitted control data transmitted from each of the plurality of light-emitting chips via the different one of the plurality of first signal lines match each other, the controller IC transmits the image data to each of the plurality of light-emitting chips.

8. The image forming apparatus according to claim 1, wherein the plurality of light-emitting chips is configured to expose latent images representing a plurality of test images having different densities on a surface of the photosensitive member, and wherein the controller IC is configured to transmit control data corresponding to the plurality of test images to each storage unit included in the plurality of light-emitting chips via the plurality of signal lines.

9. The image forming apparatus according to claim 1, further comprising a detection unit configured to detect a temperature of the plurality of light-emitting units, wherein, in a case where the detection unit detects an increase in the temperature of the plurality of light-emitting units, the controller IC outputs control data indicating a current value for decreasing an amount of light of the plurality of light-emitting units, and in a case where the detection unit detects a decrease in the temperature of the plurality of light-emitting units, the controller IC outputs control data indicating a current value for increasing the amount of light of the plurality of light-emitting units.

10. The image forming apparatus according to claim 1, wherein the storage unit is a first storage unit, wherein each of the plurality of light-emitting chips includes a second storage unit configured to store the image data, and wherein the controller IC is configured to transmit the output control data to each first storage unit included in the plurality of light-emitting chips via the plurality of signal lines and to transmit the image data to each second storage unit included in the plurality of light-emitting chips via the plurality of signal lines.

11. The image forming apparatus according to claim 10, wherein the plurality of light-emitting units is configured to use organic electroluminescence (EL).

12. The image forming apparatus according to claim 10, wherein each of the plurality of light-emitting chips includes a reception unit configured to receive the output control data and the image data transmitted from the controller IC, and wherein the reception unit is configured to transmit the received control data to the first storage unit and to transmit the received image data to the second storage unit.

13. The image forming apparatus according to claim 12, wherein, in a case where the reception unit receives first identification information, the reception unit transitions to a first state where the transmitted control data is stored in the first storage unit, and in a case where the reception unit receives second identification information, the reception unit transitions to a second state where the image data is stored in the second storage unit.

14. The image forming apparatus according to claim 1, wherein, even in a case where the reception unit receives the second identification information in the first state, the reception unit does not transition to the second state, and even in a case where the reception unit receives the first identification information in the second state, the reception unit does not transition to the first state.

15. The image forming apparatus according to claim 14, wherein, based on reception of the first identification information in the third state, the reception unit transitions to the first state, and based on reception of the second identification information in the third state, the reception unit transitions to the second state.

16. The image forming apparatus according to claim 1, wherein the plurality of light-emitting units is configured to use organic electroluminescence (EL).

* * * * *